US012105352B2

(12) United States Patent
Hsu et al.

(10) Patent No.: US 12,105,352 B2
(45) Date of Patent: Oct. 1, 2024

(54) OPTICAL IMAGING LENS, IMAGING DEVICE, AND ELECTRONIC DEVICE

(71) Applicants: ZHONG YANG TECHNOLOGY CO., LTD., Taichung (TW); Eterge Opto-Electronics Co., Ltd., Taichung (TW)

(72) Inventors: Chih-Cheng Hsu, Taichung (TW); Tsu-Meng Lee, Taichung (TW); Ho-Hsuan Wu, Taichung (TW); Chia-Yi Ko, Taichung (TW)

(73) Assignees: ZHONG YANG TECHNOLOGY CO., LTD., Taichung (TW); Eterge Opto-Electronics Co., Ltd., Taichung (TW)

( * ) Notice: Subject to any disclaimer, the term of this patent is extended or adjusted under 35 U.S.C. 154(b) by 488 days.

(21) Appl. No.: 17/583,213

(22) Filed: Jan. 25, 2022

(65) Prior Publication Data

US 2023/0176323 A1    Jun. 8, 2023

Related U.S. Application Data

(60) Provisional application No. 63/285,497, filed on Dec. 3, 2021.

(51) Int. Cl.
*G02B 9/60* (2006.01)
*G02B 13/00* (2006.01)
(52) U.S. Cl.
CPC ........... *G02B 9/60* (2013.01); *G02B 13/0045* (2013.01)
(58) Field of Classification Search
CPC ............... G02B 9/60; G02B 13/0045
USPC ......................... 359/696, 763, 764
See application file for complete search history.

(56) References Cited

U.S. PATENT DOCUMENTS

| | | | | |
|---|---|---|---|---|
| 8,456,757 B2* | 6/2013 | Tsai | ................... | G02B 13/0045 359/714 |
| 8,605,367 B2* | 12/2013 | Tsai | ................... | G02B 13/0045 359/764 |
| 8,605,368 B2* | 12/2013 | Tsai | ................... | G02B 13/0045 359/740 |
| 8,705,182 B1* | 4/2014 | Chen | ........................ | G02B 3/02 359/764 |
| 8,724,238 B2* | 5/2014 | Tsai | ................... | G02B 13/0045 359/764 |
| 2012/0327520 A1* | 12/2012 | Tsai | ................... | G02B 13/0045 359/714 |

(Continued)

*Primary Examiner* — William R Alexander
(74) *Attorney, Agent, or Firm* — Winston Hsu

(57) ABSTRACT

An optical imaging lens includes, in order from an object side to an image side, an aperture, a first lens, a second lens, a third lens, a fourth lens and a fifth lens, wherein the first lens has positive refractive power and includes an object-side surface being convex; the second lens has negative refractive power and includes an object-side surface being concave; the third lens has positive refractive power and includes an object-side surface being convex and an image-side surface being convex; the fourth lens has positive refractive power and includes an object-side surface being concave and an image-side surface being convex; the fifth lens has negative refractive power and includes an object-side surface being concave. When specific conditions are satisfied, the optical imaging lens can have a compact size, high thermal endurance and good imaging qualities.

16 Claims, 18 Drawing Sheets

(56) References Cited

U.S. PATENT DOCUMENTS

| | | | | |
|---|---|---|---|---|
| 2013/0033765 A1* | 2/2013 | Tsai | .................... | G02B 13/0045 |
| | | | | 359/714 |
| 2013/0188263 A1* | 7/2013 | Tsai | .................... | G02B 13/0045 |
| | | | | 359/714 |
| 2013/0235474 A1* | 9/2013 | Tsai | .................... | G02B 13/0045 |
| | | | | 359/714 |
| 2013/0242415 A1* | 9/2013 | Nihei | ...................... | G02B 9/60 |
| | | | | 359/764 |
| 2015/0070787 A1* | 3/2015 | Yoneyama | .......... | G02B 13/0045 |
| | | | | 359/740 |
| 2015/0085385 A1* | 3/2015 | Tanaka | ............... | G02B 13/0045 |
| | | | | 359/764 |
| 2015/0085386 A1* | 3/2015 | Tanaka | ............... | G02B 13/0045 |
| | | | | 359/764 |
| 2016/0154208 A1* | 6/2016 | Teraoka | ............. | G02B 13/0045 |
| | | | | 359/764 |

* cited by examiner

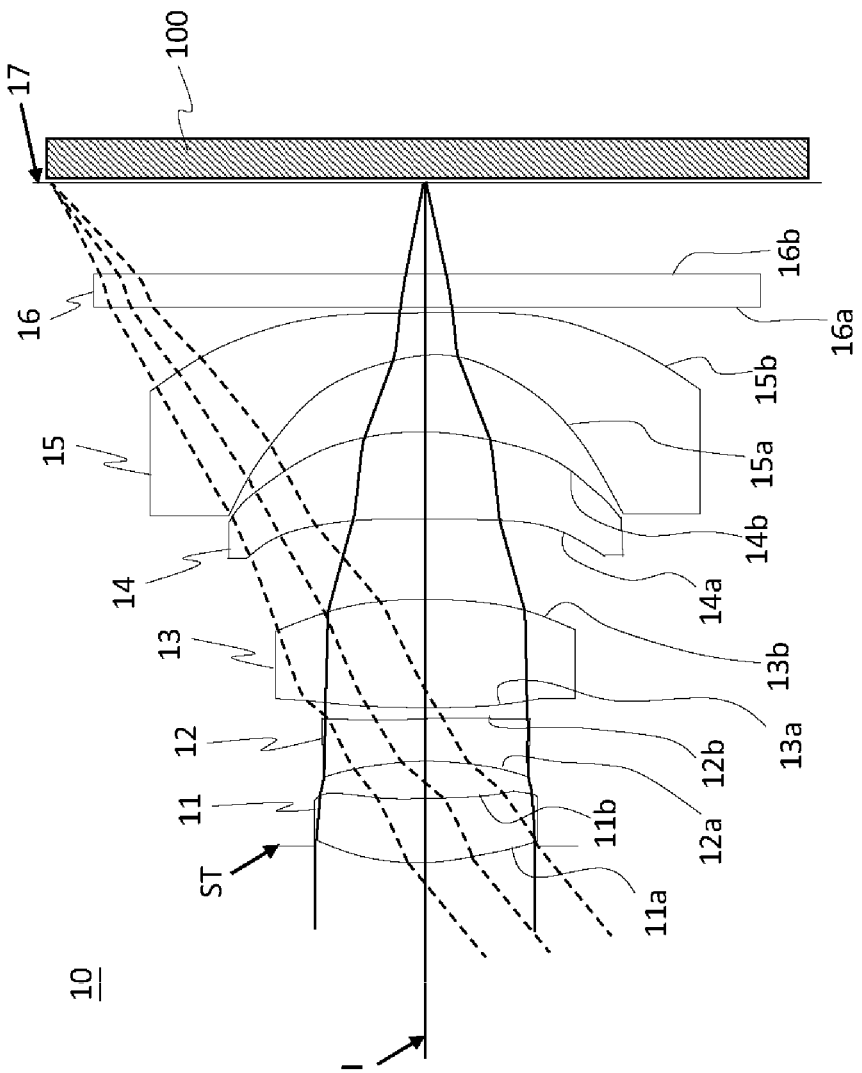

OPTICAL IMAGING LENS, IMAGING DEVICE, AND ELECTRONIC DEVICE

CROSS REFERENCE TO RELATED APPLICATIONS

This application claims the benefit of U.S. Provisional Application No. 63/285,497, filed on Dec. 3, 2021. The content of the application is incorporated herein by reference.

BACKGROUND OF THE INVENTION

1. Field of the Invention

The present disclosure is related to an optical imaging lens, and more particularly, to an optical imaging lens and an optical imaging device applicable to an electronic device.

2. Description of the Prior Art

With the advancement of semiconductor manufacturing technology, the image sensors (such as CCD and CMOS Image Sensor) could be made with a reduced size to meet the requirement of miniaturized photographing devices. This improvement enables consumer electronic products to have miniaturized photographing devices equipped therein so as to increase their added values. Taking portable electronic devices such as smartphones as an example, because of its convenience and portability, today's consumers often use smartphones to take pictures instead of using traditional digital cameras. Consumers' expectation for the portable electronic devices keeps on growing. In addition to having a sophisticated look, the portable electronic devices also have to be compact and light-weight. Therefore, this trend has made it necessary for the miniaturized photographing devices to be further miniaturized in its volume so as to be accommodated in a thin and compact portable electronic device.

Furthermore, consumers also demand an increased imaging quality for miniaturized cameras. In addition to providing a sharp image, it is also expected to have a wide field of view and good thermal stability to meet different application needs in various situations. Hence, a further need exists for a miniaturized camera which could provide good image quality and have good thermal stability.

SUMMARY OF THE INVENTION

Therefore, the present disclosure provides an optical imaging lens includes, in order from an object-side to an image side, an aperture, a first lens, a second lens, a third lens, a fourth lens and a fifth lens, wherein the first lens has positive refractive power and includes an object-side surface being convex; the second lens has negative refractive power and includes an object-side surface being concave; the third lens has positive refractive power and includes an object-side surface being convex and an image-side surface being convex; the fourth lens has positive refractive power and includes an object-side surface being concave and an image-side surface being convex; the fifth lens has negative refractive power and includes an object-side surface being concave; wherein, the optical imaging lens includes a total number of five lens elements; the following conditions are satisfied:

$0.75 \leq f123/EFL \leq 0.95$; and $-2.10 \leq f2/f3 \leq -1.15$;

where, f123 is a combined focal length of a group of the first lens, the second lens and the third lens; EFL is an effective focal length of the optical imaging lens; f2 is a focal length of the second lens; f3 is a focal length of the third lens.

According to an embodiment of the present disclosure, a curvature radius of the object-side surface of the first lens is R1; a curvature radius of the image-side surface of the first lens is R2, and the following condition is satisfied:

$-0.45 \leq R1/R2 \leq 0.55$.

According to an embodiment of the present disclosure, a curvature radius of the object-side surface of the second lens is R3; a curvature radius of the image-side surface of the second lens is R4, and the following condition is satisfied:

$-12.55 \leq R3/R4 \leq 0.20$.

According to an embodiment of the present disclosure, a curvature radius of the image-side surface of the second lens is R4; a curvature radius of the image-side surface of the third lens is R6, and the following condition is satisfied:

$-4.50 \leq R4/R6 \leq -2.00$.

According to an embodiment of the present disclosure, a curvature radius of the image-side surface of the first lens is R2; a curvature radius of the object-side surface of the second lens is R3, and the following condition is satisfied:

$-4.30 \leq R2/R3 \leq 1.50$.

According to an embodiment of the present disclosure, a curvature radius of the image-side surface of the second lens is R4; a curvature radius of the object-side surface of the third lens is R5, and the following condition is satisfied:

$-2.50 \leq R4/R5 \leq 3.30$.

According to an embodiment of the present disclosure, a thickness of the first lens on the optical axis of the optical imaging lens is CT1; a distance from the image-side surface of the first lens to the object-side surface of the second lens along the optical axis of the optical imaging lens is AT12, and the following condition is satisfied:

$1.35 \leq CT1/AT12 \leq 9.15$.

According to an embodiment of the present disclosure, a thickness of the second lens on the optical axis of the optical imaging lens is CT2; a distance from the image-side surface of the second lens to the object-side surface of the third lens along the optical axis of the optical imaging lens is AT23, and the following condition is satisfied:

$1.05 \leq CT2/AT23 \leq 10.05$.

According to an embodiment of the present disclosure, an abbe number of the first lens is Vd1, an abbe number of the second lens is Vd2, an abbe number of the third lens is Vd3, and the following condition is satisfied:

$105.0 \leq (Vd1+Vd2+Vd3) \leq 125.0$.

According to an embodiment of the present disclosure, an abbe number of the first lens is Vd1, an abbe number of the second lens is Vd2, an abbe number of the third lens is Vd3, an abbe number of the fourth lens is Vd4, an abbe number of the fifth lens is Vd5, and the following condition is satisfied:

$2.20 \leq (Vd1+Vd2+Vd3)/(Vd4+Vd5) \leq 2.85$.

According to an embodiment of the present disclosure, wherein an abbe number of the first lens is Vd1, and the following condition is satisfied:

$$Vd1 \geq 30.$$

According to an embodiment of the present disclosure, a thickness of the first lens on the optical axis of the optical imaging lens is CT1; a thickness of the second lens on the optical axis of the optical imaging lens is CT2; a thickness of the third lens on the optical axis of the optical imaging lens is CT3; a thickness of the fourth lens on the optical axis of the optical imaging lens is CT4; a thickness of the fifth lens on the optical axis of the optical imaging lens is CT5; a distance from the image-side surface of the first lens to the object-side surface of the second lens along the optical axis of the optical imaging lens is AT12; a distance from the image-side surface of the second lens to the object-side surface of the third lens along the optical axis of the optical imaging lens is AT23; a distance from the image-side surface of the fourth lens to the object-side surface of the fifth lens along the optical axis of the optical imaging lens is AT45, and the following condition is satisfied:

$$1.00 \leq (CT1+AT12+CT2+AT23+CT3)/(CT4+AT45+CT5) \leq 1.55.$$

According to an embodiment of the present disclosure, an abbe number of the first lens is Vd1, an abbe number of the second lens is Vd2, an abbe number of the third lens is Vd3, a thickness of the first lens on the optical axis of the optical imaging lens is CT1; a thickness of the second lens on the optical axis of the optical imaging lens is CT2; a thickness of the third lens on the optical axis of the optical imaging lens is CT3; a distance from the image-side surface of the first lens to the object-side surface of the second lens along the optical axis of the optical imaging lens is AT12; a distance from the image-side surface of the second lens to the object-side surface of the third lens along the optical axis of the optical imaging lens is AT23, and the following condition is satisfied:

$$60.00 \leq (Vd1+Vd2+Vd3)/(CT1+AT12+CT2+AT23+CT3) \leq 75.50.$$

According to an embodiment of the present disclosure, a thickness of the first lens on the optical axis of the optical imaging lens is CT1; a thickness of the second lens on the optical axis of the optical imaging lens is CT2; a thickness of the third lens on the optical axis of the optical imaging lens is CT3; a distance from the image-side surface of the first lens to the object-side surface of the second lens along the optical axis of the optical imaging lens is AT12; a distance from the image-side surface of the second lens to the object-side surface of the third lens along the optical axis of the optical imaging lens is AT23; a distance from the object-side surface of the first lens to the image-side surface of the fifth lens along the optical axis of the optical imaging lens is TA, and the following condition is satisfied:

$$0.450 \leq (CT1+AT12+CT2+AT23+CT3)/TA \leq 0.510.$$

According to an embodiment of the present disclosure, an image-side surface of the first lens is concave.

According to an embodiment of the present disclosure, an image-side surface of the second lens is concave.

According to an embodiment of the present disclosure, an image-side surface of the fifth lens is convex.

According to an embodiment of the present disclosure, the image-side surface of the fifth lens includes at least one inflection point.

According to an embodiment of the present disclosure, an off-axis region of the image-side surface of the fifth lens is convex.

The present disclosure further provides an imaging device which includes the optical imaging lens mentioned above and an image sensor, wherein the image sensor is disposed on an image plane of the optical imaging lens.

The present disclosure further provides an electronic device including the aforementioned imaging device.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

The present disclosure will be described hereinafter with reference to the appended drawings. It is to be noted that all the drawings are shown for the purpose of illustrating the technical concept of the present disclosure or embodiments thereof, in which:

FIG. 1A is a schematic view of an optical imaging lens according to a first embodiment of the present disclosure;

DETAILED DESCRIPTION

Figure 1B:
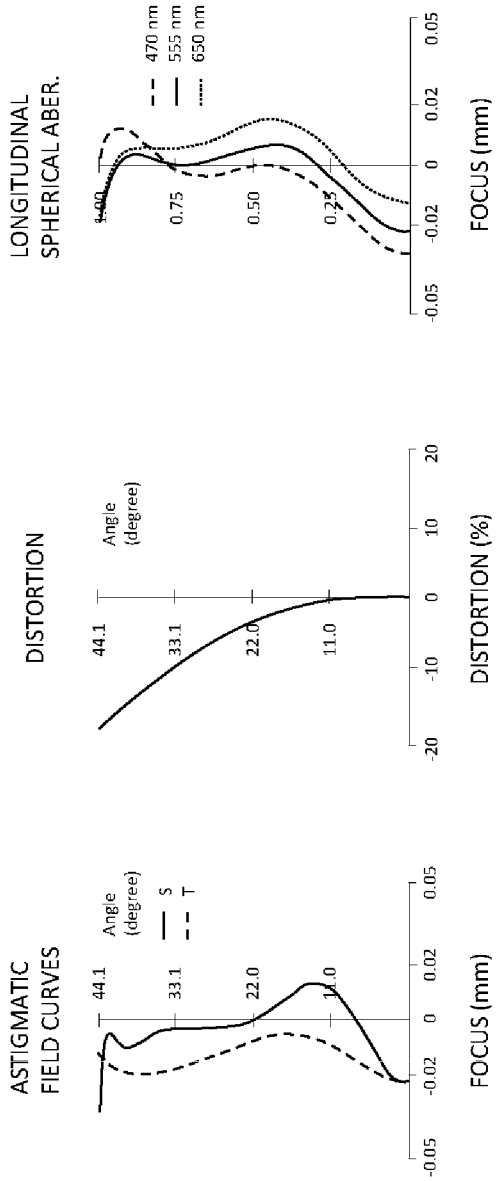
FIG. 1B shows longitudinal spherical aberration curves, astigmatic field curves and a distortion curve of the optical imaging lens according to the first embodiment.

According to the embodiments of the present disclosure, each lens element of the optical imaging lens can be made of glass or plastic materials and is not limited to the material shown in the embodiments. When a lens element is made of glass material, the surfaces of the lens could be processed with grinding or molding methods. In addition, a glass lens can have high thermal stability and good hardness, which mitigates the environmental temperature effects on the optical imaging lens, such that the service life of the optical imaging lens could be extended. When a plastic lens element is utilized, it is favorable to reduce the total weight of the optical imaging lens and lower the production cost.

According to the embodiments of the present disclosure, each lens element of the optical imaging lens includes an object-side surface facing an imaged object, and an image-side surface facing an image plane. The surface shape of a lens element is considered as being convex or concave according to a shape at a paraxial region of the lens element. The paraxial region is an area near the optical axis within the optical imaging lens. For example, a lens element which has a convex shape at the paraxial region of the object-side surface is defined as having an object-side surface being convex. That is, although the object-side surface of the lens element is considered as being convex, but an off-axis region thereof could have a convex shape or a concave shape. Further, the surface shape at the paraxial region of a lens element is determined by a curvature radius of the surface of the lens element, depending on the curvature radius is positive or negative. For example, if a curvature radius of an object-side surface of a lens element is positive, the object-side surface of the lens elements is convex. On the contrary, if the curvature radius thereof is negative, the object-side surface of the lens element is concave. For an image-side surface of a lens element, if a curvature radius thereof is positive, the image-side surface of the lens element is concave; on the contrary, if the curvature radius thereof is negative, the image-side surface of the lent element is convex.

According to the embodiments of the present disclosure, an object-side surface and an image-side surface of a lens element can be spherical or aspheric surfaces. When a lens element is formed with aspheric surface, it is favorable to correct image aberration of the optical imaging lens, such as spherical aberration, and could reduce a total number of the lens elements of the optical imaging lens. However, aspheric lens will increase the manufacturing cost of the optical imaging lens. In the exemplary embodiments of the present disclosure, some lens surfaces are formed as spherical surfaces, but the lens surfaces also could be formed as aspheric surfaces depending on the design requirement. Alternatively, some lens surfaces are formed as aspheric surfaces, but the lens surfaces also could be formed as spherical surfaces if necessary.

According to the embodiments of the present disclosure, a total track length (TTL) of the optical imaging lens is defined as a distance from the object-side surface of the first lens to the image plane of the optical imaging lens along the optical axis. A maximum image height of the optical imaging lens is abbreviated as ImgH. When an image sensor is disposed on the image plane, the maximum image height ImgH is a half of the diagonal length of effective sensing region of the image sensor. In the following embodiments, the units of the curvature radii, the thickness of the lens elements, the distances between the lens elements, the total track length TTL, the maximum image height ImgH and focal length are millimeters.

The present disclosure provides an optical imaging lens including, in order from an object-side to an image side, an aperture, a first lens, a second lens, a third lens, a fourth lens and a fifth lens, wherein the first lens has positive refractive power and includes an object-side surface being convex; the second lens has negative refractive power and includes an object-side surface being concave; the third lens has positive refractive power and includes an object-side surface being convex and an image-side surface being convex; the fourth lens has positive refractive power and includes an object-side surface being concave and an image-side surface being convex; the fifth lens has negative refractive power and includes an object-side surface being concave; the optical imaging lens includes a total number of five lens elements.

The first lens has positive refractive power and includes the object-side surface being convex. The first lens is used as a converging lens to collect light to form an image. Preferably, the first lens is made of plastic material; at least one of an object-side surface and the image-side surface of the first lens is aspheric. When at least one of the object-side and/or image-side surfaces of the first lens is aspheric, it is favorable to correct spherical aberration. The first lens is adapted to adjust a propagation path of the collecting light. Preferably, the first lens is formed of a material having a greater abbe number, for example, an abbe number which is greater than 30, and is preferably greater than 50, for correcting chromatic aberration.

The second lens has negative refractive power and is concave on the object-side surface. The image-side surface of the second lens could be concave or convex; in the preferred embodiment of the present disclosure, the image-side surface of the second lens is concave, for correcting Seidel aberration. Preferably, the second lens is formed of a material having a small abbe number, for example, an abbe number which is smaller than 25, for correcting chromatic aberration.

The third lens and the fourth lens both have positive refractive powers. Both of the object-side and the image-side surfaces of the third lens are convex. The object-side surface of the fourth lens is concave and the image-side surface of the fourth lens is convex. By arranging the third lens and the fourth lens sequentially along the optical axis, a positive refractive power could be suitably distributed on the third lens and the fourth lens such that it is favorable to increase thickness uniformity of the third lens and the fourth lens and correct astigmatism aberration. Furthermore, by controlling a ratio between the focal lengths of the second lens, the third lens and the fourth lens, it is favorable to compensate thermal drift of the focal plane of the optical imaging lens, thereby increasing thermal stability thereof.

The fifth lens has negative refractive power and is concave on the object-side surface. The image-side surface of the fifth lens could be concave or convex; in the preferred embodiment of the present disclosure, the image-side surface of the fifth lens is convex. When the image-side surface has at least one inflection point, it is favorable to minimize a total track length (TTL) of the optical imaging lens and to adjust a light incident angle on the image plane to increase brightness uniformity from a center area to an edge region of an image sensor.

According to the embodiments of the present disclosure, a thermal focal shift of the optical imaging lens from 20° C.

to 75° C. is less than 14 m (micrometers), more preferred less than 5 m. Therefore, thermal drift of the optical imaging lens can be effectively compensated and temperature effect on the image quality could be lowered.

Preferably, when a combined focal length of a group of the first lens, the second lens and the third lens is f123; an effective focal length of the optical imaging lens is EFL; the following condition is satisfied: $0.75 \leq f123/EFL \leq 0.95$. Therefore, a ratio between the f123 and EFL can be suitably minimized the whole structure of the optical imaging lens.

Preferably, when a focal length of the second lens is f2; a focal length of the third lens is f3; the following condition is satisfied: $-2.10 \leq f2/f3 \leq -1.15$. Therefore, by adjusting a ratio between the focal lengths of the second lens and the third lens, it is favorable to compensate thermal drift of the focal plane of the optical imaging lens, thereby increasing thermal stability thereof.

Preferably, when a curvature radius of the object-side surface of the first lens is R1; a curvature radius of the image-side surface of the first lens is R2, the following condition is satisfied: $-0.45 \leq R1/R2 \leq 0.55$. Therefore, a ratio between the curvature radius R1 and R2 can be suitably controlled such that it is favorable to correct coma aberration of the optical imaging lens.

Preferably, when a curvature radius of the object-side surface of the second lens is R3; a curvature radius of the image-side surface of the second lens is R4, the following condition is satisfied: $-12.55 \leq R3/R4 \leq 0.20$. Therefore, a ratio between the curvature radius R3 and R4 can be suitably controlled such that it is favorable to correct coma aberration of the optical imaging lens.

Preferably, when a curvature radius of the image-side surface of the second lens is R4; a curvature radius of the image-side surface of the third lens is R6, the following condition is satisfied: $-4.50\ R4/R6 \leq -2.00$. Therefore, a ratio between the curvature radius R4 and R6 can be suitably controlled such that it is favorable to correct coma aberration of the optical imaging lens.

Preferably, when a curvature radius of the image-side surface of the first lens is R2; a curvature radius of the object-side surface of the second lens is R3, the following condition is satisfied: $-4.30\ R2/R3 \leq 1.50$. Therefore, a ratio between the curvature radius R2 and R3 can be suitably controlled such that it is favorable to correct coma aberration of the optical imaging lens.

Preferably, when a curvature radius of the image-side surface of the second lens is R4; a curvature radius of the object-side surface of the third lens is R5, the following condition is satisfied: $-2.50 \leq R4/R5 \leq 3.30$. Therefore, a ratio between the curvature radius R4 and R5 can be suitably controlled such that it is favorable to correct coma aberration of the optical imaging lens.

When a thickness of the first lens on the optical axis of the optical imaging lens is CT1; a distance from the image-side surface of the first lens to the object-side surface of the second lens along the optical axis of the optical imaging lens is AT12, the following condition is satisfied: $1.35 \leq CT1/AT12 \leq 9.15$. Therefore, it is favorable to adjust a ratio between CT1 and AT12 to correct astigmatism aberration and to compensate thermal drift. Furthermore, when the condition is satisfied, assembling sensitivity of the optical imaging lens can be improved, thereby increasing manufacturability of the optical imaging lens.

When a thickness of the second lens on the optical axis of the optical imaging lens is CT2; a distance from the image-side surface of the second lens to the object-side surface of the third lens along the optical axis of the optical imaging lens is AT23, the following condition is satisfied: $1.05 \leq CT2/AT23 \leq 10.05$. Therefore, it is favorable to adjust a ratio between CT2 and AT23 to correct astigmatism aberration and to compensate thermal drift. Furthermore, when the condition is satisfied, assembling sensitivity of the optical imaging lens can be improved, thereby increasing manufacturability of the optical imaging lens.

When a thickness of the first lens on the optical axis of the optical imaging lens is CT1; a thickness of the second lens on the optical axis of the optical imaging lens is CT2; a thickness of the third lens on the optical axis of the optical imaging lens is CT3; a thickness of the fourth lens on the optical axis of the optical imaging lens is CT4; a thickness of the fifth lens on the optical axis of the optical imaging lens is CT5; a distance from the image-side surface of the first lens to the object-side surface of the second lens along the optical axis of the optical imaging lens is AT12; a distance from the image-side surface of the second lens to the object-side surface of the third lens along the optical axis of the optical imaging lens is AT23; a distance from the image-side surface of the fourth lens to the object-side surface of the fifth lens along the optical axis of the optical imaging lens is AT45, the following condition is satisfied: $1.00 \leq (CT1+AT12+CT2+AT23+CT3)/(CT4+AT45+CT5) \leq 1.55$. Therefore, it is favorable to adjust a ratio between (CT1+AT12+CT2+AT23+CT3) and (CT4+AT45+CT5) to correct astigmatism aberration and to compensate thermal drift. Furthermore, when the condition is satisfied, assembling sensitivity of the optical imaging lens can be improved, thereby increasing manufacturability of the optical imaging lens.

When an abbe number of the first lens is Vd1, an abbe number of the second lens is Vd2, an abbe number of the third lens is Vd3, a thickness of the first lens on the optical axis of the optical imaging lens is CT1; a thickness of the second lens on the optical axis of the optical imaging lens is CT2; a thickness of the third lens on the optical axis of the optical imaging lens is CT3; a distance from the image-side surface of the first lens to the object-side surface of the second lens along the optical axis of the optical imaging lens is AT12; a distance from the image-side surface of the second lens to the object-side surface of the third lens along the optical axis of the optical imaging lens is AT23, the following condition is satisfied: $60.00 \leq (Vd1+Vd2+Vd3)/(CT1+AT12+CT2+AT23+CT3) \leq 75.50$. Therefore, it is favorable to adjust a ratio between (Vd1+Vd2+Vd3) and (CT1+AT12+CT2+AT23+CT3) to correct astigmatism aberration and to compensate thermal drift. Furthermore, when the condition is satisfied, assembling sensitivity of the optical imaging lens can be improved, thereby increasing manufacturability of the optical imaging lens.

When a thickness of the first lens on the optical axis of the optical imaging lens is CT1; a thickness of the second lens on the optical axis of the optical imaging lens is CT2; a thickness of the third lens on the optical axis of the optical imaging lens is CT3; a distance from the image-side surface of the first lens to the object-side surface of the second lens along the optical axis of the optical imaging lens is AT12; a distance from the image-side surface of the second lens to the object-side surface of the third lens along the optical axis of the optical imaging lens is AT23; a distance from the object-side surface of the first lens to the image-side surface of the fifth lens along the optical axis of the optical imaging lens is TA, the following condition is satisfied: $0.450 \leq (CT1+AT12+CT2+AT23+CT3)/TA \leq 0.510$. Therefore, it is favorable to adjust a ratio between (CT1+AT12+CT2+AT23+CT3) and TA to correct astigmatism aberration and to compensate thermal drift. Furthermore, when the condition is satisfied, assembling sensitivity of the optical imaging lens can be improved, thereby increasing manufacturability of the optical imaging lens.

When an abbe number of the first lens is Vd1, an abbe number of the second lens is Vd2, an abbe number of the third lens is Vd3, and the following condition is satisfied: $105.0 \leq (Vd1+Vd2+Vd3) \leq 125.0$. Therefore, chromatic aberration of the optical imaging lens can be effectively corrected.

When an abbe number of the first lens is Vd1, an abbe number of the second lens is Vd2, an abbe number of the third lens is Vd3, an abbe number of the fourth lens is Vd4, an abbe number of the fifth lens is Vd5, the following condition is satisfied: $2.20 \leq (Vd1+Vd2+Vd3)/(Vd4+Vd5) \leq 2.85$. Therefore, chromatic aberration of the optical imaging lens can be effectively corrected.

When an abbe number of the first lens is Vd1, the following condition is satisfied: $Vd1 \geq 30$. Therefore, chromatic aberration of the optical imaging lens can be further corrected.

First Embodiment

FIG. 1A is a schematic view of an optical imaging lens according to the first embodiment of the present disclosure. FIG. 1B shows, in order from left to right, astigmatic field curves, a distortion curve and longitudinal spherical aberration curves of the optical imaging lens according to the first embodiment.

As shown in FIG. 1A, the optical imaging lens 10 of the first embodiment includes, in order from an object-side to an image side, an aperture ST, a first lens 11, a second lens 12, a third lens 13, a fourth lens 14 and a fifth lens 15. The optical imaging lens 10 can further include a filter element 16 and an image plane 17. An image sensor 100 can be disposed on the image plane 17 to form an imaging device (not labeled).

The first lens 11 has positive refractive power and includes an object-side surface 11a being convex and an image-side surface 11b being concave, wherein both of the object-side surface 11a and the image-side surface 11b of the first lens 11 are formed as aspheric surfaces. The first lens 11 is made of plastic material.

The second lens 12 has negative refractive power and includes an object-side surface 12a being concave and an image-side surface 12b being concave, wherein both of the object-side surface 12a and the image-side surface 12b of the second lens 12 are formed as aspheric surfaces. The second lens 12 is made of plastic material.

The third lens 13 has positive refractive power and includes an object-side surface 13a being convex and an image-side surface 13b being convex, wherein both of the object-side surface 13a and the image-side surface 13b of the third lens 13 are formed as aspheric surfaces. More detail, the object-side surface 13a of the third lens 13 is convex in a paraxial region thereof, while an off-axis region of the object-side surface 13a is concave; the image-side surface 13b of the third lens 13 is convex in both of a paraxial region and an off-axis region thereof. The third lens 13 is made of glass material.

The fourth lens 14 has positive refractive power and includes an object-side surface 14a being concave and an image-side surface 14b being convex, wherein both of the object-side surface 14a and the image-side surface 14b of the fourth lens 14 are formed as aspheric surfaces. More detail, the object-side surface 14a of the fourth lens 14 is concave in a paraxial region thereof, while an off-axis region of the object-side surface 14a is convex; the image-side surface 14b of the fourth lens 14 is convex in a paraxial region thereof, while an off-axis region of the image-side surface 14b is concave. The fourth lens 14 is made of plastic material.

The fifth lens 15 has negative refractive power and includes an object-side surface 15a being concave and an image-side surface 15b being convex, wherein both of the object-side surface 15a and the image-side surface 15b of the fifth lens 15 are formed as aspheric surfaces. More detail, the object-side surface 15a of the fifth lens 15 is concave in a paraxial region thereof, while an off-axis region thereof is convex; the image-side surface 15b of the fifth lens 15 is convex in a paraxial region thereof, while an off-axis region thereof is concave, wherein each of the object-side surface 15a and the image-side surface 15b includes inflection points which are symmetrical to the optical axis I. The fifth lens 15 is made of plastic material.

Figure 8:
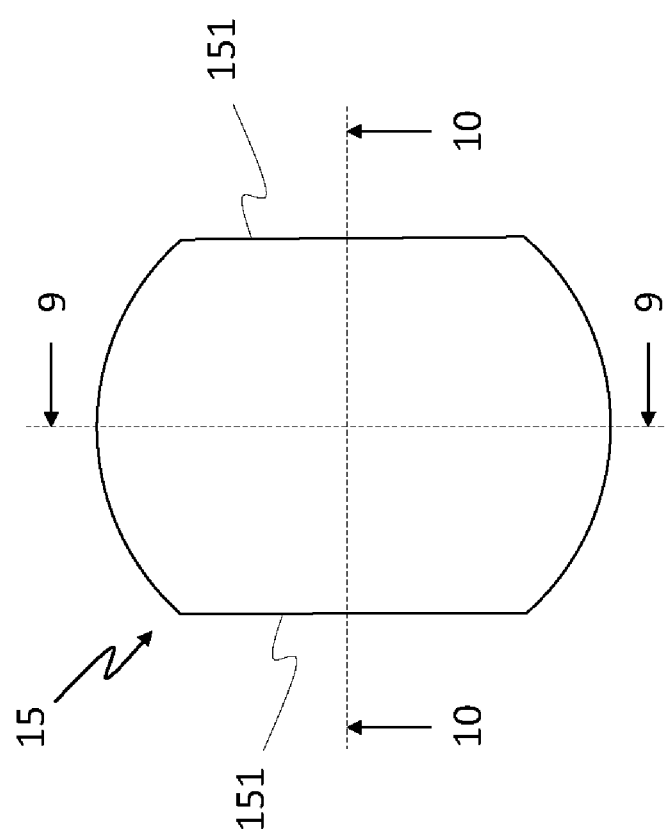
FIG. 8 is a front view of the fifth lens of the optical imaging lens according to the first embodiment of the present disclosure.
Figure 9:
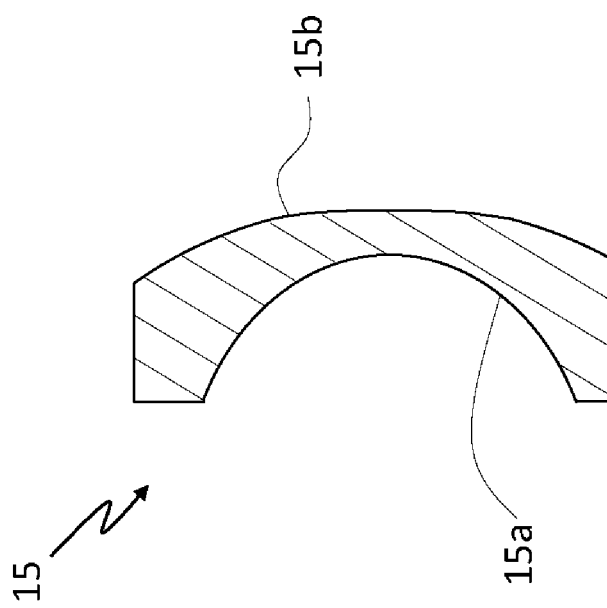
FIG. 9 is a cross sectional view as taken along line 9-9 of FIG. 8.
Figure 10:
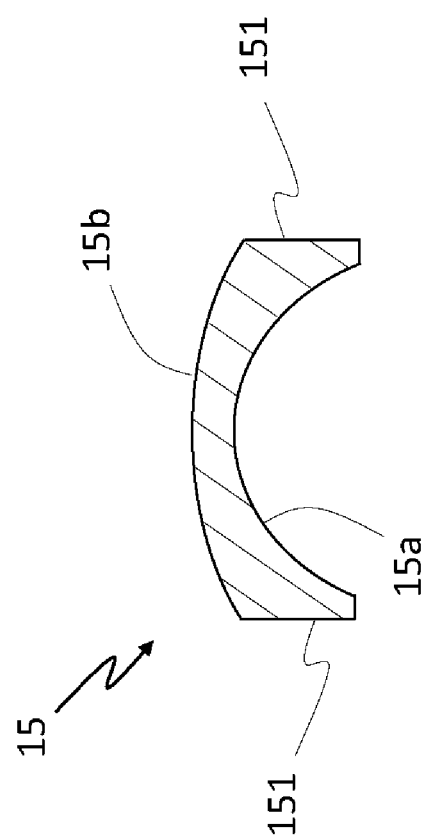
FIG. 10 is a cross sectional view as taken along line 10-10 of FIG. 8.

FIG. 8 is a front view of the fifth lens of the optical imaging lens according to the first embodiment of the present disclosure; FIG. 9 is a cross-sectional view as taken along line 9-9 of FIG. 8; FIG. 10 is a cross-sectional view as taken along line 10-10 of FIG. 8.

As shown in FIG. 8, the fifth lens 15 of the optical imaging lens 10 according to the first embodiment of the present disclosure is formed to have an H-cut shape having two straight edges 151 respectively on the two symmetric side of the fifth lens 15, so that the fifth lens 15 could be more compact and light-weight. In FIG. 9, the cross-sectional view of the fifth lens 15 is the same as shown in FIG. 1A. In FIG. 10, the cross-sectional view of the fifth lens 15 is in an orthogonal direction of the two straight edges 151 respectively on the two symmetric side of the fifth lens 15.

Figure 11:
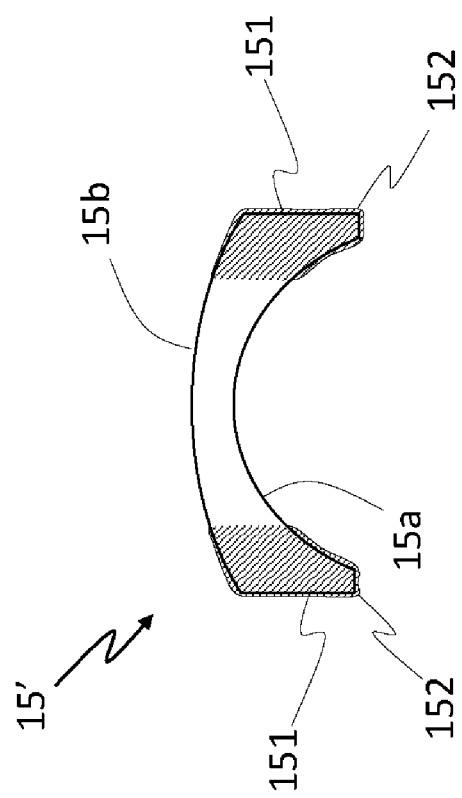
FIG. 11 is a top view of the fifth lens of the optical imaging lens according to a ninth embodiment of the present disclosure.
Figure 12:
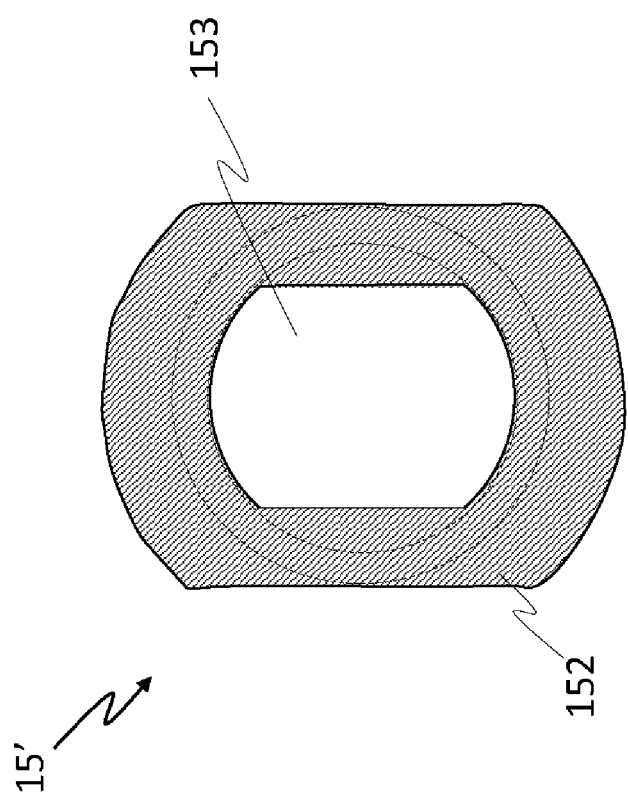
FIG. 12 is a front view of the fifth lens of the optical imaging lens according to the ninth embodiment of the present disclosure.

FIG. 11 is a top view of the fifth lens of the optical imaging lens according to a ninth embodiment of the present disclosure; FIG. 12 is a front view of the fifth lens of the optical imaging lens according to the ninth embodiment of the present disclosure.

As shown in FIG. 11, the fifth lens 15 of the optical imaging lens 10 according to the first embodiment of the present disclosure is partially covered by a light-shading layer 152 to form a new fifth lens 15'. In the ninth embodiment of the present disclosure, the light-shading layer 152 is formed to cover an edge area of the fifth lens 15, for separating a light-shading area (not labeled) and a light-permeable area 153, as shown in FIG. 12. By the light-shading layer 152, the optical imaging lens 10 of the first embodiment is effectively to reduce aberration and can provide good imaging quality.

In the following description, the fifth lenses of the optical imaging lens of other embodiments use the same H-cut shape as the first embodiment or the ninth embodiment. Therefore, the duplicated description would be omitted for brevity.

The filter element 16 is disposed between the fifth lens 15 and the image plane 17, and adapted to filter out light of predetermined wavelengths. For example, the filter element 16 can be an IR-cut filter for filtering out infrared light. Both surfaces 16a, 16b of the filter element 16 are flat surfaces. The filter element 16 is made of glass material.

The image sensor 100 can be a CCD (Charge-Coupled Device) image sensor or a CMOS (Complementary Metal-Oxide-Semiconductor) image sensor, for example.

The equation of the aspheric surface profiles is expressed as follows:

$$X(Y) = \frac{Y^2}{R} / \left(1 + \sqrt{1 - (1+K)\frac{Y^2}{R^2}}\right) + \sum_{i=1}^{n} A_i \times Y^i$$

where,
- X is the relative distance between a point on the aspheric surface spaced at a distance Y from the optical axis and the tangential plane at the aspheric surface vertex on the optical axis;
- Y is the vertical distance from the point on the aspheric surface to the optical axis;
- R is the curvature radius;
- k is the conic coefficient; and
- Ai is the i-th aspheric coefficient.

Referring to Table 1, which provides the optical parameters of the optical imaging lens 10 according to the first embodiment. In Table 1, each surface number is referred to one lens surface. For example, the object-side surface of the first lens 11 is denoted as surface 11a; the image-side surface of the first lens 11 is denoted as surface 11b, and so on. The symbol "ASP" in the column next to the surface number is used to define that a shape of the lens surface is aspheric; while the symbol "Plano" is used to define that the lens surface is flat. The value in the distance column denotes a distance from a lens surface to a next lens surface along the optical axis I. For example, the distance from the object-side surface 11a to the image-side surface 11b is 0.413 mm, which means that a thickness of the first lens 11 on the optical axis is 0.413 mm. Similarly, the distance from the image-side surface 11b of the first lens 11 to the object-side surface 12a of the second lens 12 is 0.225 mm, and so on. In the following embodiments, the optical parameters have the same definitions as Table 1 and the duplicated description would be omitted for brevity. In the upper row of Table 1, an effective focal length is abbreviated as EFL, f-number is abbreviated as Fno, half of a maximum filed is abbreviated as HFOV, and the corresponding values thereof are also shown therein.

TABLE 1

First Embodiment
EFL = 3.24 mm, Fno = 2.20, HFOV = 42.56 deg

|  | Surface | Surface Type | Curvature Radius (mm) | Distance (mm) | Refractive Index | Abbe Number | Focal Length (mm) | Material |
|---|---|---|---|---|---|---|---|---|
| Object |  |  | Infinite | 1000 |  |  |  |  |
| Aperture | ST |  | Infinite | −0.098 |  |  |  |  |
| 1st Lens | 11a | ASP | 1.878 | 0.413 | 1.545 | 56.0 | 5.62 | Plastic |
|  | 11b | ASP | 4.457 | 0.225 |  |  |  |  |
| 2nd Lens | 12a | ASP | −4.608 | 0.290 | 1.661 | 20.4 | −5.28 | Plastic |
|  | 12b | ASP | 15.281 | 0.057 |  |  |  |  |
| 3rd Lens | 13a | ASP | 4.676 | 0.711 | 1.801 | 45.5 | 2.61 | Glass |
|  | 13b | ASP | −3.562 | 0.521 |  |  |  |  |
| 4th Lens | 14a | ASP | −18.564 | 0.573 | 1.640 | 23.5 | 3.85 | Plastic |
|  | 14b | ASP | −2.218 | 0.492 |  |  |  |  |
| 5th Lens | 15a | ASP | −1.113 | 0.281 | 1.661 | 20.4 | −1.74 | Plastic |
|  | 15b | ASP | −29.065 | 0.041 |  |  |  |  |
| Filter element | 16a | Plano | Infinite | 0.210 | 1.517 | 64.2 |  | Glass |
|  | 16b | Plano | Infinite | 0.610 |  |  |  |  |
| Image Plane | 17 | Plano | Infinite |  |  |  |  |  |

Reference Wavelength: 555 nm

Table 2 below lists the values of the aspheric coefficients used in the above equation for each of the aspheric surfaces indicated in Table 1, wherein K is the conic coefficient; $A_4$-$A_{14}$ are the 4th order to the 14th order aspheric coefficients, respectively. For example, the conic coefficient K of the image-side surface 11b of the first lens 11 is 1.62, and so on. In the following description, the tables for each of the optical imaging lens of other embodiments use the same definition as the first embodiment. Therefore, the duplicated description would be omitted for brevity.

TABLE 2

First Embodiment_ Aspheric Coefficients

| Surface | 11a | 11b | 12a | 12b | 13a | 13b |
|---|---|---|---|---|---|---|
| K | −1.26E+01 | 1.62E+00 | 2.82E+01 | 7.59E+01 | −6.14E+01 | −4.26E+00 |
| $A_4$ | 1.98E−01 | −6.69E−02 | −4.73E−02 | −7.06E−02 | −1.03E−03 | −5.48E−02 |
| $A_6$ | −2.95E−01 | −1.23E−01 | 2.65E−02 | 1.17E−01 | 3.53E−02 | −4.10E−02 |
| $A_8$ | 2.86E−01 | 1.00E−01 | −8.95E−02 | −6.68E−03 | −8.08E−02 | 7.09E−02 |
| $A_{10}$ | −1.98E−01 | −2.61E−01 | −3.33E−02 | −5.75E−02 | 2.03E−01 | −4.70E−02 |
| $A_{12}$ | 0.00E+00 | 0.00E+00 | 0.00E+00 | 0.00E+00 | −1.76E−01 | 1.13E−02 |
| $A_{14}$ | 0.00E+00 | 0.00E+00 | 0.00E+00 | 0.00E+00 | 5.74E−02 | 1.43E−02 |

| Surface | 14a | 14b | 15a | 15b |
|---|---|---|---|---|
| K | 2.79E+01 | −1.11E+01 | −2.29E+00 | 5.95E+01 |
| $A_4$ | −6.04E−02 | −9.46E−02 | −1.33E−01 | −6.99E−02 |
| $A_6$ | −1.06E−02 | 2.49E−02 | −4.18E−02 | 1.20E−02 |
| $A_8$ | −3.89E−02 | −3.76E−02 | 4.84E−02 | 1.19E−03 |
| $A_{10}$ | −8.47E−03 | −1.56E−03 | −3.09E−02 | −1.03E−03 |
| $A_{12}$ | 3.08E−02 | 6.56E−03 | 6.80E−03 | 1.31E−04 |
| $A_{14}$ | −7.26E−03 | 1.65E−04 | 1.13E−03 | 4.53E−06 |

In the first embodiment, the combined focal length of a group of the first lens, the second lens and the third lens is f123; an effective focal length of the optical imaging lens is EFL, and they satisfy the condition: f123/EFL=0.89.

In the first embodiment, the focal length of the second lens is f2; a focal length of the third lens is f3, they satisfy the condition: f2/f3=−2.02.

In the first embodiment, the curvature radius of the object-side surface of the first lens is R1; a curvature radius of the image-side surface of the first lens is R2, and they satisfy the condition: R1/R2=0.42.

In the first embodiment, the curvature radius of the object-side surface of the second lens is R3; a curvature radius of the image-side surface of the second lens is R4, and they satisfy the condition: R3/R4=−0.30.

In the first embodiment, the curvature radius of the image-side surface of the second lens is R4; a curvature radius of the image-side surface of the third lens is R6, and they satisfy the condition: R4/R6=−4.28.

In the first embodiment, the curvature radius of the image-side surface of the first lens is R2; a curvature radius of the object-side surface of the second lens is R3, and they satisfy the condition: R2/R3=−0.97.

In the first embodiment, the curvature radius of the image-side surface of the second lens is R4; a curvature radius of the object-side surface of the third lens is R5, and they satisfy the condition: R4/R5=3.27.

In the first embodiment, the thickness of the first lens on the optical axis of the optical imaging lens is CT1; a distance from the image-side surface of the first lens to the object-side surface of the second lens along the optical axis of the optical imaging lens is AT12, and they satisfy the condition: CT1/AT12=1.84.

In the first embodiment, the thickness of the second lens on the optical axis of the optical imaging lens is CT2; a distance from the image-side surface of the second lens to the object-side surface of the third lens along the optical axis of the optical imaging lens is AT23, and they satisfy the condition: CT2/AT23=5.08.

In the first embodiment, the thickness of the first lens on the optical axis of the optical imaging lens is CT1; a thickness of the second lens on the optical axis of the optical imaging lens is CT2; a thickness of the third lens on the optical axis of the optical imaging lens is CT3; a thickness of the fourth lens on the optical axis of the optical imaging lens is CT4; a thickness of the fifth lens on the optical axis of the optical imaging lens is CT5; a distance from the image-side surface of the first lens to the object-side surface of the second lens along the optical axis of the optical imaging lens is AT12; a distance from the image-side surface of the second lens to the object-side surface of the third lens along the optical axis of the optical imaging lens is AT23; a distance from the image-side surface of the fourth lens to the object-side surface of the fifth lens along the optical axis of the optical imaging lens is AT45, and they satisfy the condition: (CT1+AT12+CT2+AT23+CT3)/(CT4+AT45+CT5)=1.26.

In the first embodiment, the abbe number of the first lens is Vd1, the abbe number of the second lens is Vd2, the abbe number of the third lens is Vd3, the thickness of the first lens on the optical axis of the optical imaging lens is CT1; a thickness of the second lens on the optical axis of the optical imaging lens is CT2; a thickness of the third lens on the optical axis of the optical imaging lens is CT3; a distance from the image-side surface of the first lens to the object-side surface of the second lens along the optical axis of the optical imaging lens is AT12; a distance from the image-side surface of the second lens to the object-side surface of the third lens along the optical axis of the optical imaging lens is AT23, and they satisfy the condition:

$$(Vd1+Vd2+Vd3)/(CT1+AT12+CT2+AT23+CT3)=70.22.$$

In the first embodiment, the thickness of the first lens on the optical axis of the optical imaging lens is CT1; a thickness of the second lens on the optical axis of the optical imaging lens is CT2; a thickness of the third lens on the optical axis of the optical imaging lens is CT3; a distance from the image-side surface of the first lens to the object-side surface of the second lens along the optical axis of the optical imaging lens is AT12; a distance from the image-side surface of the second lens to the object-side surface of the third lens along the optical axis of the optical imaging lens is AT23; a distance from the object-side surface of the first lens to the image-side surface of the fifth lens along the optical axis of the optical imaging lens is TA, and they satisfy the condition: (CT1+AT12+CT2+AT23+CT3)/TA=0.476.

In the first embodiment, the abbe number of the first lens is Vd1, an abbe number of the second lens is Vd2, an abbe number of the third lens is Vd3, and they satisfy the condition:

$$(Vd1+Vd2+Vd3)=119.10.$$

In the first embodiment, the abbe number of the first lens is Vd1, an abbe number of the second lens is Vd2, an abbe number of the third lens is Vd3, an abbe number of the fourth lens is Vd4, an abbe number of the fifth lens is Vd5, and they satisfy the condition:

$$(Vd1+Vd2+Vd3)/(Vd4+Vd5)=2.78.$$

In the first embodiment, the abbe number of the first lens 11 is Vd1 and Vd1=55.99.

From the values of the above conditions, the optical imaging lens 10 of the first embodiment satisfies the above-mentioned conditions.

Referring to FIG. 1B, in order from left to right, which shows astigmatic field curves, a distortion curve and longitudinal spherical aberration curves of the optical imaging lens 10 according to the first embodiment. From the longitudinal spherical aberration curves, it shows that the off-axis rays in different heights at the respective wavelengths 470 nm, 555 nm, and 650 nm are focused in a vicinity of the imaging point. Based on extents of deviation of the curves for the respective wavelengths, imaging point deviations of the off-axis rays in different heights are controlled within a range of +0.03 mm. From the astigmatism field aberration curves at the reference wavelength 555 nm, the aberration of the sagittal curves in the whole field range falls within +0.03 mm; the aberration of the tangential curves in the whole field range falls within +0.04 mm. From the distortion aberration curves, the distortion aberration can be controlled within a range of 16.62%. Hence, the optical imaging lens 10 of the first embodiment is effectively to reduce aberration and can provide good imaging quality.

Second Embodiment

Figure 2A:
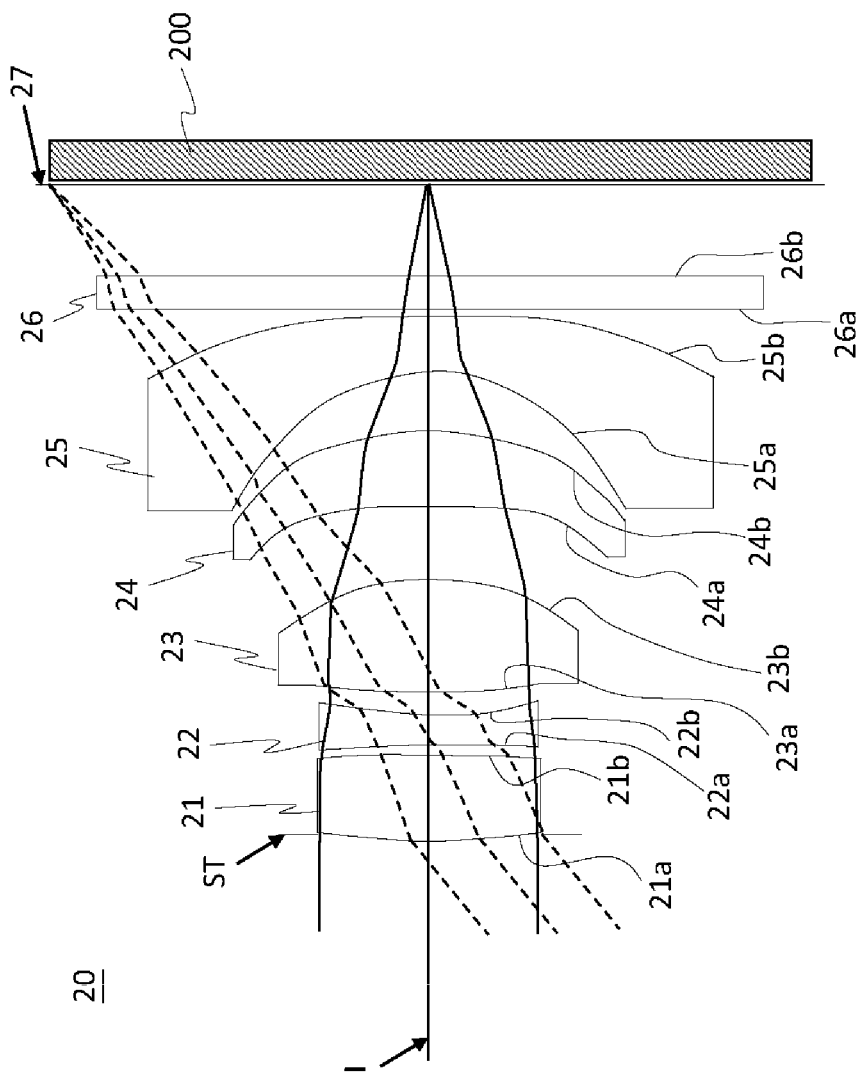
FIG. 2A is a schematic view of an optical imaging lens according to a second embodiment of the present disclosure.
Figure 2B:
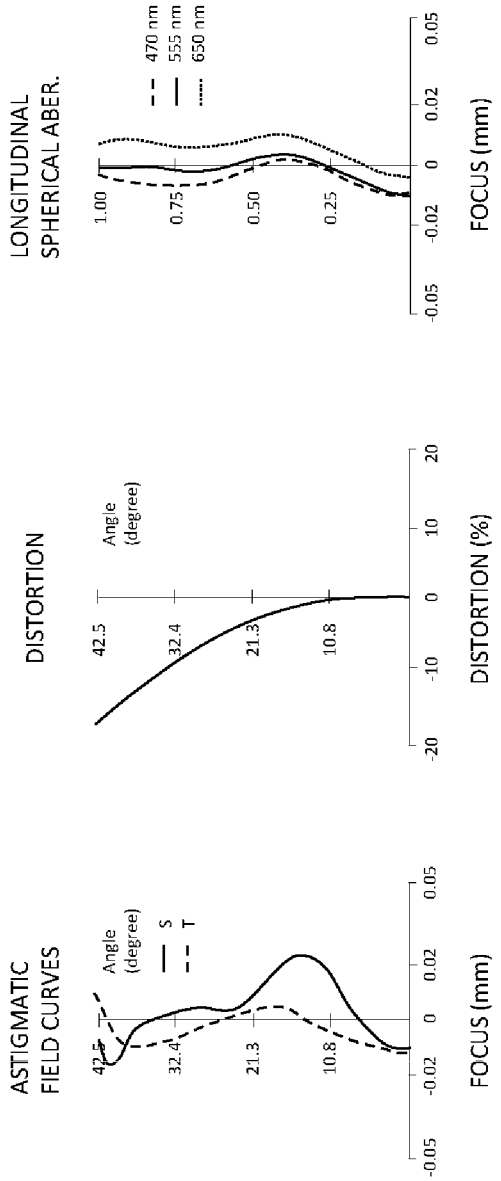
FIG. 2B shows longitudinal spherical aberration curves, astigmatic field curves and a distortion curve of the optical imaging lens according to the second embodiment.

FIG. 2A is a schematic view of an optical imaging lens according to the second embodiment of the present disclosure. FIG. 2B shows, in order from left to right, astigmatic field curves, a distortion curve and longitudinal spherical aberration curves of the optical imaging lens according to the second embodiment.

As shown in FIG. 2A, the optical imaging lens 20 of the second embodiment includes, in order from an object-side to an image side, an aperture ST, a first lens 21, a second lens 22, a third lens 23, a fourth lens 24 and a fifth lens 25. The optical imaging lens 20 can further include a filter element 26 and an image plane 27. An image sensor 200 can be disposed on the image plane 27 to form an imaging device (not labeled).

The first lens 21 has positive refractive power and includes an object-side surface 21a being convex and an image-side surface 21b being convex, wherein both of the object-side surface 21a and the image-side surface 21b of the first lens 21 are formed as aspheric surfaces. The first lens 21 is made of glass material.

The second lens 22 has negative refractive power and includes an object-side surface 22a being concave and an image-side surface 22b being concave, wherein both of the object-side surface 22a and the image-side surface 22b of the second lens 22 are formed as aspheric surfaces. The second lens 22 is made of plastic material.

The third lens 23 has positive refractive power and includes an object-side surface 23a being convex and an image-side surface 23b being convex, wherein both of the object-side surface 23a and the image-side surface 23b of the third lens 23 are formed as aspheric surfaces. More detail, the object-side surface 23a of the third lens 23 is convex in a paraxial region thereof, while an off-axis region of the object-side surface 23a is concave; the image-side surface 23b of the third lens 23 is convex in both of a paraxial region and an off-axis region thereof. The third lens 23 is made of plastic material.

The fourth lens 24 has positive refractive power and includes an object-side surface 24a being concave and an image-side surface 24b being convex, wherein both of the object-side surface 24a and the image-side surface 24b of the fourth lens 24 are formed as aspheric surfaces. More detail, the object-side surface 24a of the fourth lens 24 is concave in a paraxial region thereof, while an off-axis region of the object-side surface 24a is convex. The fourth lens 24 is made of plastic material.

The fifth lens 25 has negative refractive power and includes an object-side surface 25a being concave and an image-side surface 25b being concave, wherein both of the object-side surface 25a and the image-side surface 25b of the fifth lens 25 are formed as aspheric surfaces. More detail, the object-side surface 25a of the fifth lens 25 is concave in a paraxial region thereof, while an off-axis region of the object-side surface 25a is convex; the image-side surface 25b of the fifth lens 25 is concave in a paraxial region thereof, while an off-axis region of the image-side surface 25b is convex, wherein each of the object-side surface 25a and the image-side surface 25b includes inflection points which are symmetrical to the optical axis I. The fifth lens 25 is made of plastic material.

The filter element 26 is disposed between the fifth lens 25 and the image plane 27, and adapted to filter out light of predetermined wavelengths. For example, the filter element 26 can be an IR-cut filter for filtering out infrared light. Both surfaces 26a, 26b of the filter element 26 are flat surfaces. The filter element 26 is made of glass material.

The image sensor 200 can be a CCD (Charge-Coupled Device) image sensor or a CMOS (Complementary Metal-Oxide-Semiconductor) image sensor, for example.

Referring to Table 3 and Table 4, wherein Table 3 shows the optical parameters of the optical imaging lens 20 according to the second embodiment of the present disclosure; and Table 4 lists the values of the aspheric coefficients for each of the aspheric surfaces indicated in Table 3.

TABLE 3

Second Embodiment
EFL = 3.28 mm, Fno = 2.26, HFOV = 42.49 deg

| | Surface | Surface Type | Curvature Radius (mm) | Distance (mm) | Refractive Index | Abbe Number | Focal Length (mm) | Material |
|---|---|---|---|---|---|---|---|---|
| Object | | | Infinite | 1000 | | | | |
| Aperture | ST | | Infinite | −0.053 | | | | |
| 1st Lens | 21a | ASP | 3.300 | 0.561 | 1.882 | 37.2 | 3.07 | Glass |
| | 21b | ASP | −14.315 | 0.070 | | | | |
| 2nd Lens | 22a | ASP | −9.965 | 0.201 | 1.651 | 21.5 | −3.05 | Plastic |
| | 22b | ASP | 2.528 | 0.163 | | | | |
| 3rd Lens | 23a | ASP | 3.482 | 0.729 | 1.537 | 56.0 | 2.80 | Plastic |
| | 23b | ASP | −2.455 | 0.481 | | | | |
| 4th Lens | 24a | ASP | −20.000 | 0.514 | 1.640 | 23.5 | 3.50 | Plastic |
| | 24b | ASP | −2.046 | 0.410 | | | | |
| 5th Lens | 25a | ASP | −1.311 | 0.332 | 1.640 | 23.5 | −1.62 | Plastic |
| | 25b | ASP | 5.593 | 0.077 | | | | |
| Filter | 26a | Plano | Infinite | 0.210 | 1.517 | 64.2 | | Glass |
| element | 26b | Plano | Infinite | 0.600 | | | | |
| Image Plane | 27 | Plano | Infinite | | | | | |

Reference Wavelength: 555 nm

TABLE 4

Second Embodiment_ Aspheric Coefficients

| Surface | 21a | 21b | 22a | 22b | 23a | 23b |
|---|---|---|---|---|---|---|
| K | −8.60E+00 | 3.45E+01 | 7.40E+01 | 5.00E+00 | −6.53E+01 | 4.38E+00 |
| $A_4$ | −1.33E−02 | −2.38E−02 | 9.26E−02 | −1.59E−03 | 7.03E−02 | −6.04E−02 |
| $A_6$ | −4.63E−02 | 2.98E−02 | 1.41E−01 | 7.49E−02 | −2.44E−01 | −1.05E−01 |
| $A_8$ | 5.04E−02 | 3.68E−02 | −3.43E−01 | −1.41E−01 | 3.18E−01 | 1.87E−01 |
| $A_{10}$ | −3.34E−02 | −1.94E−01 | −2.41E−02 | −6.38E−02 | −2.28E−01 | −2.73E−01 |
| $A_{12}$ | 0.00E+00 | 0.00E+00 | 2.44E−01 | 4.25E−02 | −2.92E−02 | 2.33E−01 |
| $A_{14}$ | 0.00E+00 | 0.00E+00 | −5.34E−01 | 3.26E−02 | 7.83E−02 | −9.01E−02 |

| Surface | 24a | 24b | 25a | 25b |
|---|---|---|---|---|
| K | −2.82E+01 | −9.92E−02 | −6.16E+00 | −9.70E−01 |
| $A_4$ | −2.03E−02 | 1.16E−01 | −3.14E−01 | −1.73E−01 |
| $A_6$ | −1.44E−01 | −2.17E−01 | 2.28E−02 | 6.13E−02 |
| $A_8$ | 7.84E−02 | 1.12E−01 | 5.67E−02 | −8.31E−03 |
| $A_{10}$ | −8.12E−02 | −4.32E−02 | −1.29E−02 | −8.59E−04 |
| $A_{12}$ | −4.16E−04 | −7.91E−03 | −1.15E−02 | 2.41E−04 |
| $A_{14}$ | 2.01E−02 | 8.99E−03 | 5.18E−03 | −1.95E−07 |

Table 5 lists the corresponding values for the abovementioned conditions of the optical imaging lens 20 according to the second embodiment. As shown in Table 5, the optical imaging lens 20 satisfies the abovementioned conditions.

TABLE 5

Second Embodiment

| No. | Condition | Value |
|---|---|---|
| 1 | f123/EFL | 0.88 |
| 2 | f2/f3 | −1.09 |
| 3 | R1/R2 | −0.23 |
| 4 | R3/R4 | −3.94 |
| 5 | R4/R6 | −1.04 |
| 6 | R2/R3 | 1.44 |
| 7 | R4/R5 | 0.73 |
| 8 | CT1/AT12 | 8.00 |
| 9 | CT2/AT23 | 1.23 |
| 10 | (CT1 + AT12 + CT2 + AT23 + CT3)/(CT4 + AT45 + CT5) | 1.37 |

TABLE 5-continued

Second Embodiment

| No. | Condition | Value |
|---|---|---|
| 11 | (Vd1 + Vd2 + Vd3)/(CT1 + AT12 + CT2 + AT23 + CT3) | 66.53 |
| 12 | (CT1 + AT12 + CT2 + AT23 + CT3)/TA | 0.498 |
| 13 | (Vd1 + Vd2 + Vd3)/(Vd4 + Vd5) | 2.44 |
| 14 | Vd1 | 37.22 |
| 15 | (Vd1 + Vd2 + Vd3) | 114.70 |

Referring to FIG. 2B, in order from left to right, which shows astigmatic field curves, a distortion curve and longitudinal spherical aberration curves of the optical imaging lens 20 according to the second embodiment. From the longitudinal spherical aberration curves, it shows that the off-axis rays in different heights at the respective wavelengths 470 nm, 555 nm, and 650 nm are focused in a vicinity of the imaging point. Based on extents of deviation of the curves for the respective wavelengths, imaging point deviations of the off-axis rays in different heights are controlled within a range of +0.02 mm. From the astigmatism field aberration curves at the reference wavelength 555 nm, the aberration of the sagittal curves in the whole field range falls within +0.01 mm; the aberration of the tangential curves in the whole field range falls within +0.03 mm. From the distortion aberration curves, the distortion aberration can be controlled within a range of 16.9%. Hence, the optical imaging lens 20 of the second embodiment is effectively to reduce aberration and can provide good imaging quality.

Third Embodiment

Figure 3A:
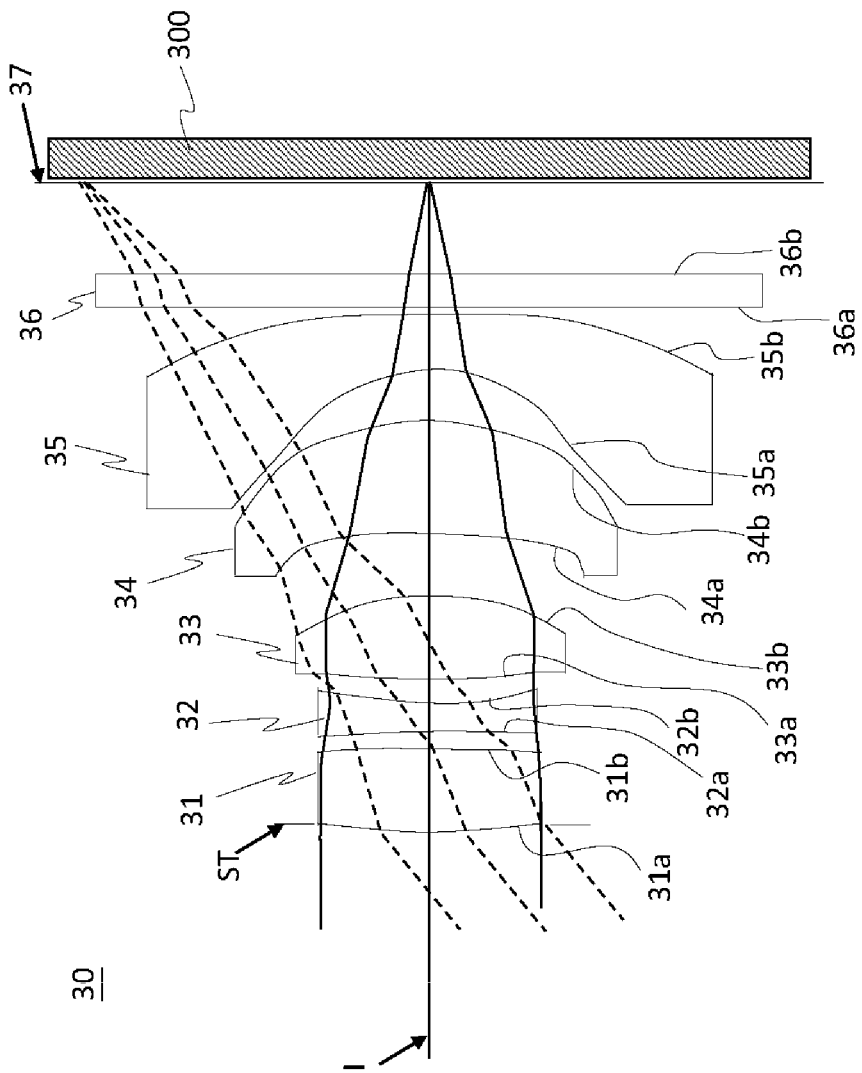
FIG. 3A is a schematic view of an optical imaging lens according to a third embodiment of the present disclosure.
Figure 3B:
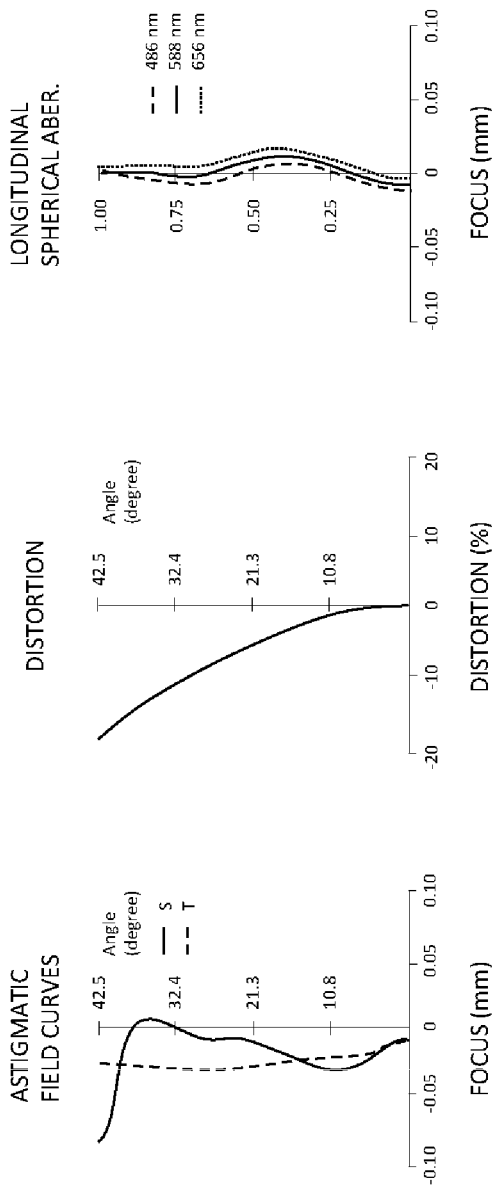
FIG. 3B shows longitudinal spherical aberration curves, astigmatic field curves and a distortion curve of the optical imaging lens according to the third embodiment.

FIG. 3A is a schematic view of an optical imaging lens according to the third embodiment of the present disclosure. FIG. 3B shows, in order from left to right, astigmatic field curves, a distortion curve and longitudinal spherical aberration curves of the optical imaging lens according to the third embodiment.

As shown in FIG. 3A, the optical imaging lens 30 of the third embodiment includes, in order from an object-side to an image side, an aperture ST, a first lens 31, a second lens 32, a third lens 33, a fourth lens 34 and a fifth lens 35. The optical imaging lens 30 can further include a filter element 36 and an image plane 37. An image sensor 300 can be disposed on the image plane 37 to form an imaging device (not labeled).

The first lens 31 has positive refractive power and includes an object-side surface 31a being convex and an image-side surface 31b being convex, wherein both of the object-side surface 31a and the image-side surface 31b of the first lens 31 are formed as aspheric surfaces. The first lens 31 is made of glass material.

The second lens 32 has negative refractive power and includes an object-side surface 32a being concave and an image-side surface 32b being concave, wherein both of the object-side surface 32a and the image-side surface 32b of the second lens 32 are formed as aspheric surfaces. More detail, the object-side surface 32a of the second lens 32 is concave in a paraxial region thereof, while an off-axis region of the object-side surface 32a is convex. The second lens 32 is made of plastic material.

The third lens 33 has positive refractive power and includes an object-side surface 33a being convex and an image-side surface 33b being convex, wherein both of the object-side surface 33a and the image-side surface 33b of the third lens 33 are formed as aspheric surfaces. More detail, the object-side surface 33a of the third lens 33 is convex in a paraxial region thereof, while an off-axis region of the object-side surface 33a is concave; the image-side surface 33b of the third lens 33 is convex in both of a paraxial region and an off-axis region thereof. The third lens 33 is made of plastic material.

The fourth lens 34 has positive refractive power and includes an object-side surface 34a being concave and an image-side surface 34b being convex, wherein both of the object-side surface 34a and the image-side surface 34b of the fourth lens 34 are formed as aspheric surfaces. More detail, the object-side surface 34a of the fourth lens 34 is concave in a paraxial region thereof, while an off-axis region of the object-side surface 34a is convex. The fourth lens 34 is made of plastic material.

The fifth lens 35 has negative refractive power and includes an object-side surface 35a being concave and an image-side surface 35b being concave, wherein both of the object-side surface 35a and the image-side surface 35b of the fifth lens 35 are formed as aspheric surfaces. More detail, the object-side surface 35a of the fifth lens 35 is concave in a paraxial region thereof, while an off-axis region of the object-side surface 35a is convex; the image-side surface 35b of the fifth lens 35 is concave in a paraxial region thereof, while an off-axis region of the image-side surface 35b is convex, wherein each of the object-side surface 35a and the image-side surface 35b includes inflection points which are symmetrical to the optical axis I. The fifth lens 35 is made of plastic material.

The filter element 36 is disposed between the fifth lens 35 and the image plane 37, and adapted to filter out light of predetermined wavelengths. For example, the filter element 36 can be an IR-cut filter for filtering out infrared light. Both surfaces 36a, 36b of the filter element 36 are flat surfaces. The filter element 36 is made of glass material.

The image sensor 300 can be a CCD (Charge-Coupled Device) image sensor or a CMOS (Complementary Metal-Oxide-Semiconductor) image sensor, for example.

Referring to Table 6 and Table 7, wherein Table 6 shows the optical parameters of the optical imaging lens 30 according to the third embodiment of the present disclosure; Table 7 lists the values of the aspheric coefficients for each of the aspheric surfaces indicated in Table 6.

TABLE 6

Third embodiment
EFL = 3.33 mm, Fno = 2.22, HFOV = 38.37 deg

| | Surface | Surface Type | Curvature Radius (mm) | Distance (mm) | Refractive Index | Abbe Number | Focal Length (mm) | Material |
|---|---|---|---|---|---|---|---|---|
| Object | | | Infinite | 1000 | | | | |
| Aperture | ST | | Infinite | −0.061 | | | | |
| 1st Lens | 31a | ASP | 3.391 | 0.572 | 1.852 | 40.1 | 3.10 | Glass |
| | 31b | ASP | −10.986 | 0.089 | | | | |
| 2nd Lens | 32a | ASP | −26.872 | 0.200 | 1.640 | 23.5 | −3.11 | Plastic |
| | 32b | ASP | 2.155 | 0.142 | | | | |
| 3rd Lens | 33a | ASP | 3.210 | 0.564 | 1.537 | 56.0 | 2.81 | Plastic |
| | 33b | ASP | −2.667 | 0.416 | | | | |
| 4th Lens | 34a | ASP | −77.763 | 0.753 | 1.640 | 23.5 | 3.33 | Plastic |
| | 34b | ASP | −2.082 | 0.323 | | | | |
| 5th Lens | 35a | ASP | −1.378 | 0.375 | 1.640 | 23.5 | −1.56 | Plastic |
| | 35b | ASP | 3.994 | 0.075 | | | | |

TABLE 6-continued

Third embodiment
EFL = 3.33 mm, Fno = 2.22, HFOV = 38.37 deg

| | Surface | Surface Type | Curvature Radius (mm) | Distance (mm) | Refractive Index | Abbe Number | Focal Length (mm) | Material |
|---|---|---|---|---|---|---|---|---|
| Filter element | 36a | Plano | Infinite | 0.210 | 1.517 | 64.2 | | Glass |
| | 36b | Plano | Infinite | 0.620 | | | | |
| Image Plane | 37 | Plano | Infinite | | | | | |

Reference Wavelength: 588 nm

TABLE 7

Third embodiment_ Aspheric Coefficients

| Surface | 31a | 31b | 32a | 32b | 33a | 33b |
|---|---|---|---|---|---|---|
| K | −7.47E+00 | 8.60E+01 | 5.48E+01 | 4.76E+00 | −9.98E+00 | 3.60E+00 |
| $A_4$ | −2.44E−02 | 2.21E−02 | 2.89E−02 | −1.06E−01 | −4.22E−02 | −1.14E−01 |
| $A_6$ | −1.53E−03 | 9.93E−03 | 2.40E−01 | 1.22E−01 | 1.89E−02 | −3.89E−02 |
| $A_8$ | 4.38E−03 | 9.37E−02 | −6.13E−01 | −2.23E−01 | 1.07E−01 | −8.12E−02 |
| $A_{10}$ | −4.26E−04 | −2.05E−01 | 1.52E−01 | −1.83E−01 | −1.40E−01 | 2.05E−01 |
| $A_{12}$ | 0.00E+00 | 0.00E+00 | 3.11E−01 | 5.42E−02 | −4.62E−02 | −2.14E−01 |
| $A_{14}$ | 0.00E+00 | 0.00E+00 | −7.10E−01 | 4.34E−02 | 1.04E−01 | 7.83E−02 |

| Surface | 34a | 34b | 35a | 35b |
|---|---|---|---|---|
| K | −4.48E+01 | 1.11E−01 | −4.13E+00 | −9.00E+01 |
| $A_4$ | −3.95E−02 | 9.69E−02 | −3.40E−01 | −1.72E−01 |
| $A_6$ | −2.33E−01 | −2.49E−01 | 1.83E−02 | 7.37E−02 |
| $A_8$ | 1.89E−01 | 9.86E−02 | 4.16E−02 | −9.80E−03 |
| $A_{10}$ | −1.61E−01 | −5.47E−03 | 8.35E−03 | −1.26E−03 |
| $A_{12}$ | −2.32E−02 | −2.92E−02 | −2.58E−03 | 2.64E−04 |
| $A_{14}$ | 2.06E−02 | 1.43E−02 | −6.62E−04 | 8.65E−06 |

Table 8 lists the corresponding values for the abovementioned conditions of the optical imaging lens 30 according to the third embodiment. As shown in Table 8, the optical imaging lens 30 satisfies the abovementioned conditions.

TABLE 8

Third Embodiment

| No. | Condition | Value |
|---|---|---|
| 1 | f123/EFL | 0.87 |
| 2 | f2/f3 | −1.11 |
| 3 | R1/R2 | −0.31 |
| 4 | R3/R4 | −12.47 |
| 5 | R4/R6 | −0.80 |
| 6 | R2/R3 | 0.41 |
| 7 | R4/R5 | 0.67 |
| 8 | CT1/AT12 | 6.40 |
| 9 | CT2/AT23 | 1.41 |
| 10 | (CT1 + AT12 + CT2 + AT23 + CT3)/(CT4 + AT45 + CT5) | 1.08 |
| 11 | (Vd1 + Vd2 + Vd3)/(CT1 + AT12 + CT2 + AT23 + CT3) | 68.03 |
| 12 | (CT1 + AT12 + CT2 + AT23 + CT3)/TA | 0.456 |
| 13 | (Vd1 + Vd2 + Vd3)/(Vd4 + Vd5) | 2.54 |
| 14 | Vd1 | 40.12 |
| 15 | (Vd1 + Vd2 + Vd3) | 106.60 |

Referring to FIG. 3B, in order from left to right, which shows astigmatic field curves, a distortion curve and longitudinal spherical aberration curves of the optical imaging lens 30 according to the third embodiment. From the longitudinal spherical aberration curves, it shows that the off-axis rays in different heights at the respective wavelengths 486 nm, 588 nm, and 656 nm are focused in a vicinity of the imaging point. Based on extents of deviation of the curves for the respective wavelengths, imaging point deviations of the off-axis rays in different heights are controlled within a range of +0.02 mm. From the astigmatism field aberration curves at the reference wavelength 588 nm, the aberration of the sagittal curves in the whole field range falls within +0.04 mm; the aberration of the tangential curves in the whole field range falls within +0.10 mm. From the distortion aberration curves, the distortion aberration can be controlled within a range of 17.90%. Hence, the optical imaging lens 30 of the third embodiment is effectively to reduce aberration and can provide good imaging quality.

Fourth Embodiment

Figure 4A:
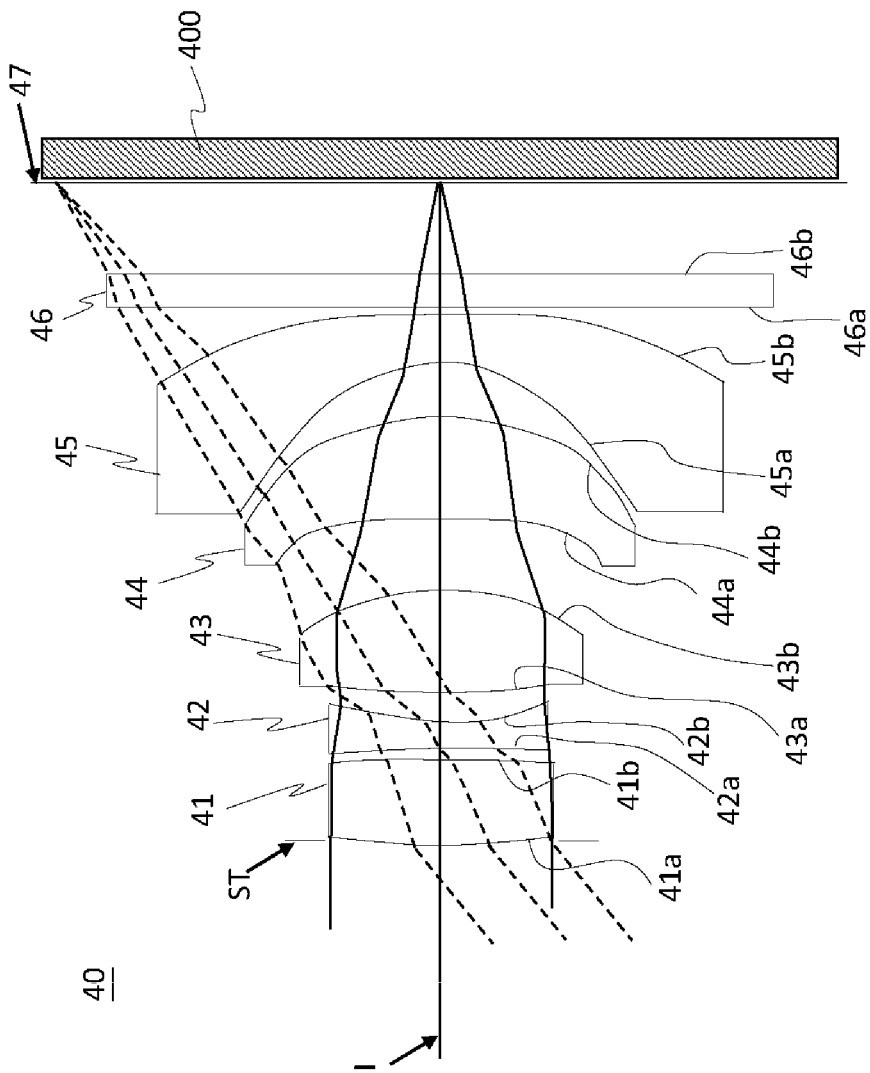
FIG. 4A is a schematic view of an optical imaging lens according to a fourth embodiment of the present disclosure.
Figure 4B:
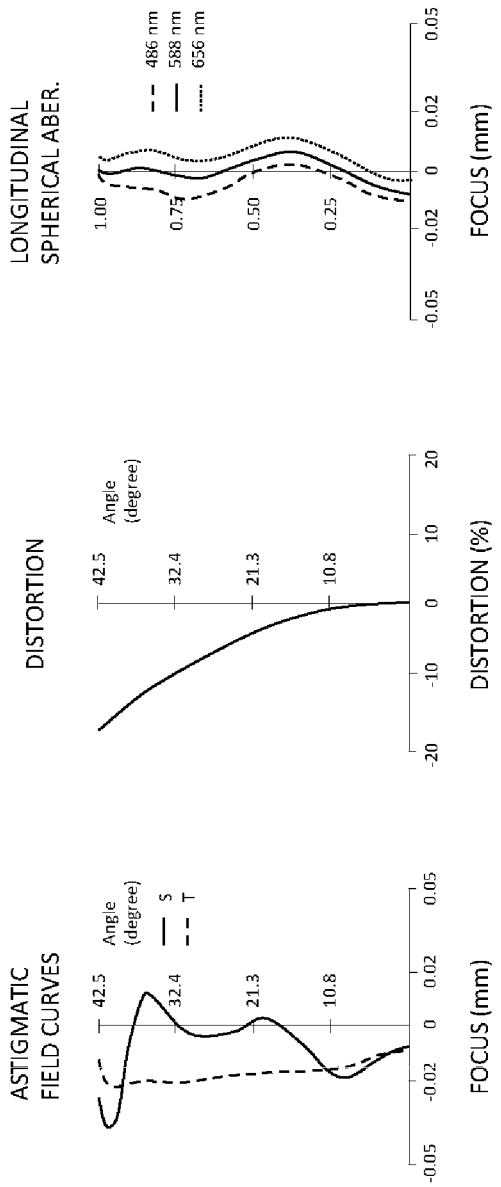
FIG. 4B shows longitudinal spherical aberration curves, astigmatic field curves and a distortion curve of the optical imaging lens according to the fourth embodiment.

FIG. 4A is a schematic view of an optical imaging lens according to the fourth embodiment of the present disclosure. FIG. 4B shows, in order from left to right, astigmatic field curves, a distortion curve and longitudinal spherical aberration curves of the optical imaging lens according to the fourth embodiment.

As shown in FIG. 4A, the optical imaging lens 40 of the fourth embodiment includes, in order from an object-side to an image side, an aperture ST, a first lens 41, a second lens 42, a third lens 43, a fourth lens 44 and a fifth lens 45. The optical imaging lens 40 can further include a filter element 46 and an image plane 47. An image sensor 400 can be disposed on the image plane 47 to form an imaging device (not labeled).

The first lens 41 has positive refractive power and includes an object-side surface 41a being convex and an image-side surface 41b being convex, wherein both of the object-side surface 41a and the image-side surface 41b of the first lens 41 are formed as aspheric surfaces. The first lens 41 is made of glass material.

The second lens 42 has negative refractive power and includes an object-side surface 42a being concave and an image-side surface 42b being concave, wherein both of the object-side surface 42a and the image-side surface 42b of the second lens 42 are formed as aspheric surfaces. More detail, the object-side surface 42a of the second lens 42 is concave in a paraxial region thereof, while an off-axis region of the object-side surface 42a is convex; the image-side surface 42b of the second lens 42 is concave in a paraxial region thereof, while an off-axis region of the image-side surface 42b is convex. The second lens 42 is made of plastic material.

The third lens 43 has positive refractive power and includes an object-side surface 43a being convex and an image-side surface 43b being convex, wherein both of the object-side surface 43a and the image-side surface 43b of the third lens 43 are formed as aspheric surfaces. More detail, the object-side surface 43a of the third lens 43 is convex in a paraxial region thereof, while an off-axis region of the object-side surface 43a is concave; the image-side surface 43b of the third lens 43 is convex in both of a paraxial region and an off-axis region thereof. The third lens 43 is made of plastic material.

The fourth lens 44 has positive refractive power and includes an object-side surface 44a being concave and an image-side surface 44b being convex, wherein both of the object-side surface 44a and the image-side surface 44b of the fourth lens 44 are formed as aspheric surfaces. The fourth lens 44 is made of plastic material.

The fifth lens 45 has negative refractive power and includes an object-side surface 45a being concave and an image-side surface 45b being concave, wherein both of the object-side surface 45a and the image-side surface 45b of the fifth lens 45 are formed as aspheric surfaces. More detail, the object-side surface 45a of the fifth lens 45 is concave in a paraxial region thereof, while an off-axis region of the object-side surface 45a is convex; the image-side surface 45b of the fifth lens 45 is concave in a paraxial region thereof, while an off-axis region of the image-side surface 45b is convex, wherein each of the object-side surface 45a and the image-side surface 45b includes inflection points which are symmetrical to the optical axis I. The fifth lens 45 is made of plastic material.

The filter element 46 is disposed between the fifth lens 45 and the image plane 47, and adapted to filter out light of predetermined wavelengths. For example, the filter element 46 can be an JR-cut filter for filtering out infrared light. Both surfaces 46a, 46b of the filter element 46 are flat surfaces. The filter element 46 is made of glass material.

The image sensor 400 can be a CCD (Charge-Coupled Device) image sensor or a CMOS (Complementary Metal-Oxide-Semiconductor) image sensor, for example.

Referring to Table 9 and Table 10, wherein Table 9 shows the optical parameters of the optical imaging lens 40 according to the fourth embodiment of the present disclosure; Table 10 lists the values of the aspheric coefficients for each of the aspheric surfaces indicated in Table 9.

TABLE 9

Fourth embodiment
EFL = 3.31 mm, Fno = 2.24, HFOV = 42.48 deg

| | Surface | Surface Type | Curvature Radius (mm) | Distance (mm) | Refractive Index | Abbe Number | Focal Length (mm) | Material |
|---|---|---|---|---|---|---|---|---|
| Object | | | Infinite | 1000 | | | | |
| Aperture | ST | | Infinite | −0.057 | | | | |
| 1st Lens | 41a | ASP | 3.442 | 0.561 | 1.904 | 31.3 | 2.90 | Glass |
| | 41b | ASP | −10.143 | 0.062 | | | | |
| 2nd Lens | 42a | ASP | −20.000 | 0.200 | 1.671 | 19.3 | −3.03 | Plastic |
| | 42b | ASP | 2.272 | 0.169 | | | | |
| 3rd Lens | 43a | ASP | 3.571 | 0.668 | 1.537 | 56.0 | 2.84 | Plastic |
| | 43b | ASP | −2.478 | 0.465 | | | | |
| 4th Lens | 44a | ASP | −20.000 | 0.652 | 1.640 | 23.5 | 3.53 | Plastic |
| | 44b | ASP | −2.056 | 0.358 | | | | |
| 5th Lens | 45a | ASP | −1.161 | 0.318 | 1.640 | 23.5 | −1.61 | Plastic |
| | 45b | ASP | 10.254 | 0.063 | | | | |
| Filter element | 46a | Plano | Infinite | 0.210 | 1.517 | 64.2 | | Glass |
| | 46b | Plano | Infinite | 0.610 | | | | |
| Image Plane | 47 | Plano | Infinite | | | | | |

Reference Wavelength: 588 nm

TABLE 10

Fourth embodiment__ Aspheric Coefficients

| Surface | 41a | 41b | 42a | 42b | 43a | 43b |
|---|---|---|---|---|---|---|
| K | −6.77E+00 | 7.80E+01 | −9.00E+01 | 4.69E+00 | −1.08E+01 | 2.65E+00 |
| $A_4$ | −2.64E−02 | 1.53E−02 | 3.90E−02 | −7.89E−02 | −4.10E−02 | −7.90E−02 |
| $A_6$ | −1.58E−02 | 1.63E−02 | 2.44E−01 | 1.03E−01 | 3.37E−03 | −4.21E−02 |
| $A_8$ | 1.61E−02 | 8.31E−02 | −5.66E−01 | −2.04E−01 | 5.37E−02 | −7.39E−02 |

TABLE 10-continued

| Fourth embodiment_ Aspheric Coefficients | | | | | | |
|---|---|---|---|---|---|---|
| $A_{10}$ | −6.87E−03 | −2.05E−01 | 2.08E−01 | −5.35E−02 | −8.90E−02 | 2.00E−01 |
| $A_{12}$ | 0.00E+00 | 0.00E+00 | 2.94E−01 | 5.13E−02 | −3.52E−02 | −2.22E−01 |
| $A_{14}$ | 0.00E+00 | 0.00E+00 | −6.65E−01 | 4.07E−02 | 9.76E−02 | 7.34E−02 |

| Surface | 44a | 44b | 45a | 45b |
|---|---|---|---|---|
| K | −8.30E+01 | −5.69E−02 | −4.54E+00 | −2.99E+01 |
| $A_4$ | −2.92E−02 | 9.71E−02 | −3.25E−01 | −1.72E−01 |
| $A_6$ | −2.02E−01 | −2.31E−01 | 1.76E−02 | 7.07E−02 |
| $A_8$ | 1.59E−01 | 9.52E−02 | 3.75E−02 | −9.63E−03 |
| $A_{10}$ | −1.33E−01 | −8.73E−03 | 6.40E−03 | −1.19E−03 |
| $A_{12}$ | −5.78E−03 | −2.87E−02 | −2.92E−03 | 2.63E−04 |
| $A_{14}$ | 1.32E−02 | 1.45E−02 | 7.95E−05 | 8.34E−06 |

Table 11 lists the corresponding values for the abovementioned conditions of the optical imaging lens 40 according to the fourth embodiment. As shown in Table 11, the optical imaging lens 40 satisfies the abovementioned conditions.

TABLE 11

Fourth Embodiment

| No. | Condition | Value |
|---|---|---|
| 1 | f123/EFL | 0.85 |
| 2 | f2/f3 | −1.07 |
| 3 | R1/R2 | −0.34 |
| 4 | R3/R4 | −8.80 |
| 5 | R4/R6 | −0.92 |
| 6 | R2/R3 | 0.51 |
| 7 | R4/R5 | 0.64 |
| 8 | CT1/AT12 | 9.00 |
| 9 | CT2/AT23 | 1.18 |
| 10 | (CT1 + AT12 + CT2 + AT23 + CT3)/(CT4 + AT45 + CT5) | 1.25 |
| 11 | (Vd1 + Vd2 + Vd3)/(CT1 + AT12 + CT2 + AT23 + CT3) | 72.05 |
| 12 | (CT1 + AT12 + CT2 + AT23 + CT3)/TA | 0.481 |
| 13 | (Vd1 + Vd2 + Vd3)/(Vd4 + Vd5) | 2.27 |
| 14 | Vd1 | 31.32 |
| 15 | (Vd1 + Vd2 + Vd3) | 119.60 |

Referring to FIG. 4B, in order from left to right, which shows astigmatic field curves, a distortion curve and longitudinal spherical aberration curves of the optical imaging lens 40 according to the fourth embodiment. From the longitudinal spherical aberration curves, it shows that the off-axis rays in different heights at the respective wavelengths 486 nm, 588 nm, and 656 nm are focused in a vicinity of the imaging point. Based on extents of deviation of the curves for the respective wavelengths, imaging point deviations of the off-axis rays in different heights are controlled within a range of +0.02 mm. From the astigmatism field aberration curves at the reference wavelength 588 nm, the aberration of the sagittal curves in the whole field range falls within +0.03 mm; the aberration of the tangential curves in the whole field range falls within +0.04 mm. From the distortion aberration curves, the distortion aberration can be controlled within a range of 17.66%. Hence, the optical imaging lens 40 of the fourth embodiment is effectively to reduce aberration and can provide good imaging quality.

Fifth Embodiment

Figure 5A:
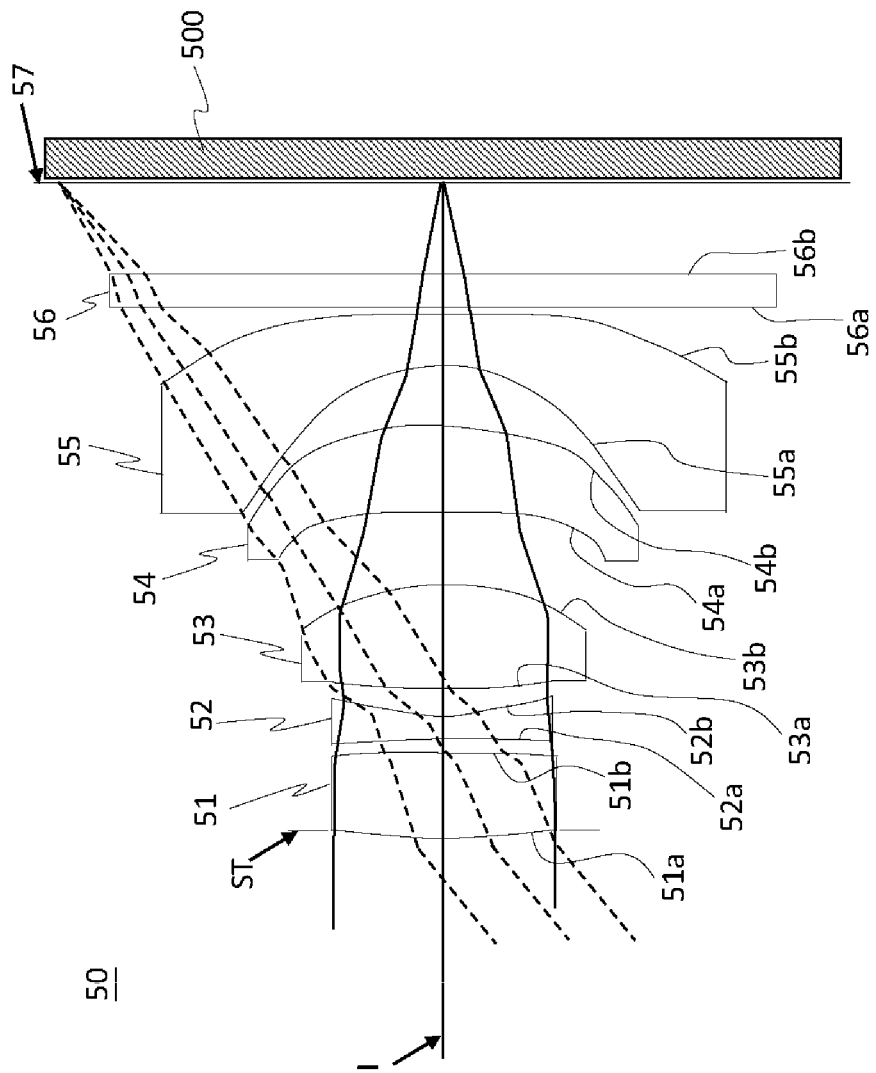
FIG. 5A is a schematic view of an optical imaging lens according to a fifth embodiment of the present disclosure.
Figure 5B:
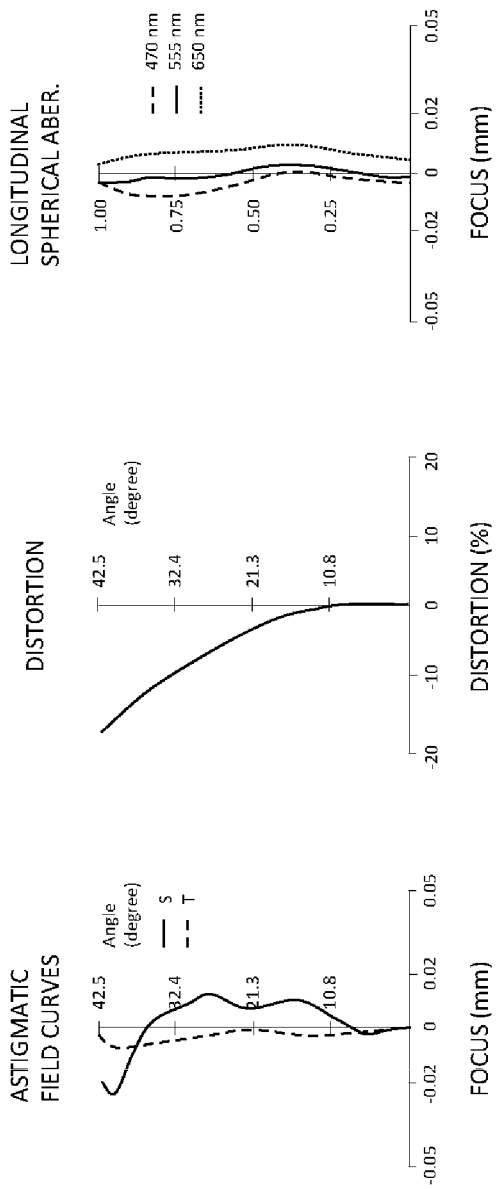
FIG. 5B shows longitudinal spherical aberration curves, astigmatic field curves and a distortion curve of the optical imaging lens according to the fifth embodiment.

FIG. 5A is a schematic view of an optical imaging lens according to the fifth embodiment of the present disclosure. FIG. 5B shows, in order from left to right, astigmatic field curves, a distortion curve and longitudinal spherical aberration curves of the optical imaging lens according to the fifth embodiment.

As shown in FIG. 5A, the optical imaging lens 50 of the fifth embodiment includes, in order from an object-side to an image side, an aperture ST, a first lens 51, a second lens 52, a third lens 53, a fourth lens 54 and a fifth lens 55. The optical imaging lens 50 can further include a filter element 56 and an image plane 57. An image sensor 500 can be disposed on the image plane 57 to form an imaging device (not labeled).

The first lens 51 has positive refractive power and includes an object-side surface 51a being convex and an image-side surface 51b being convex, wherein both of the object-side surface 51a and the image-side surface 51b of the first lens 51 are formed as aspheric surfaces. The first lens 51 is made of glass material.

The second lens 52 has negative refractive power and includes an object-side surface 52a being concave and an image-side surface 52b being concave, wherein both of the object-side surface 52a and the image-side surface 52b of the second lens 52 are formed as aspheric surfaces. The second lens 52 is made of plastic material.

The third lens 53 has positive refractive power and includes an object-side surface 53a being convex and an image-side surface 53b being convex, wherein both of the object-side surface 53a and the image-side surface 53b of the third lens 53 are formed as aspheric surfaces. More detail, the object-side surface 53a of the third lens 53 is convex in a paraxial region thereof, while an off-axis region of the object-side surface 53a is concave; the image-side surface 53b of the third lens 53 is convex in both of a paraxial region and an off-axis region thereof. The third lens 53 is made of plastic material.

The fourth lens 54 has positive refractive power and includes an object-side surface 54a being concave and an image-side surface 54b being convex, wherein both of the object-side surface 54a and the image-side surface 54b of the fourth lens 54 are formed as aspheric surfaces. More detail, the object-side surface 54a of the fourth lens 54 is concave in a paraxial region thereof, while an off-axis region of the object-side surface 54a is convex; the image-side surface 54b of the fourth lens 54 is convex in a paraxial region thereof, while an off-axis region of the image-side surface 54b is concave. The fourth lens 54 is made of plastic material.

The fifth lens 55 has negative refractive power and includes an object-side surface 55a being concave and an image-side surface 55b being concave, wherein both of the object-side surface 55a and the image-side surface 55b of the fifth lens 55 are formed as aspheric surfaces. More detail, the object-side surface 55a of the fifth lens 55 is concave in a paraxial region thereof, while an off-axis region of the object-side surface 55a is convex; the image-side surface 55b of the fifth lens 55 is concave in a paraxial region thereof, while an off-axis region of the image-side surface 55b is convex, wherein each of the object-side surface 55a and the image-side surface 55b includes inflection points which are symmetrical to the optical axis I. The fifth lens 55 is made of plastic material.

The filter element 56 is disposed between the fifth lens 55 and the image plane 57, and adapted to filter out light of predetermined wavelengths. For example, the filter element 56 can be an IR-cut filter for filtering out infrared light. Both surfaces 56a, 56b of the filter element 56 are flat surfaces. The filter element 56 is made of glass material.

The image sensor 500 can be a CCD (Charge-Coupled Device) image sensor or a CMOS (Complementary Metal-Oxide-Semiconductor) image sensor, for example.

Referring to Table 12 and Table 13, wherein Table 12 shows the optical parameters of the optical imaging lens 50 according to the fifth embodiment of the present disclosure; Table 13 lists the values of the aspheric coefficients for each of the aspheric surfaces indicated in Table 12.

TABLE 12

Fifth embodiment
EFL = 3.23 mm, Fno = 2.23, HFOV = 42.49 deg

|  | Surface | Surface Type | Curvature Radius (mm) | Distance (mm) | Refractive Index | Abbe Number | Focal Length (mm) | Material |
|---|---|---|---|---|---|---|---|---|
| Object |  |  | Infinite | 1000 |  |  |  |  |
| Aperture | ST |  | Infinite | −0.055 |  |  |  |  |
| 1st Lens | 51a | ASP | 3.455 | 0.561 | 1.882 | 37.2 | 3.07 | Glass |
|  | 51b | ASP | −11.918 | 0.069 |  |  |  |  |
| 2nd Lens | 52a | ASP | −17.447 | 0.200 | 1.651 | 21.5 | −3.18 | Plastic |
|  | 52b | ASP | 2.385 | 0.159 |  |  |  |  |
| 3rd Lens | 53a | ASP | 3.812 | 0.688 | 1.537 | 56.0 | 2.86 | Plastic |
|  | 53b | ASP | −2.425 | 0.480 |  |  |  |  |
| 4th Lens | 54a | ASP | −19.994 | 0.580 | 1.640 | 23.5 | 3.48 | Plastic |
|  | 54b | ASP | −2.038 | 0.384 |  |  |  |  |
| 5th Lens | 55a | ASP | −1.307 | 0.332 | 1.640 | 23.5 | −1.62 | Plastic |
|  | 55b | ASP | 5.630 | 0.072 |  |  |  |  |
| Filter | 56a | Plano | Infinite | 0.210 | 1.517 | 64.2 |  | Glass |
| element | 56b | Plano | Infinite | 0.610 |  |  |  |  |
| Image Plane | 57 | Plano | Infinite |  |  |  |  |  |

Reference Wavelength: 555 nm

TABLE 13

Fifth embodiment_ Aspheric Coefficients

| Surface | 51a | 51b | 52a | 52b | 53a | 53b |
|---|---|---|---|---|---|---|
| K | −6.51E+00 | 8.40E+01 | −9.00E+01 | 6.07E+00 | −2.38E+01 | 4.35E+00 |
| $A_4$ | −2.64E−02 | −9.74E−03 | 6.16E−02 | −4.06E−02 | −3.62E−02 | −8.11E−02 |
| $A_6$ | −3.29E−02 | 5.43E−02 | 2.10E−01 | 8.94E−02 | 2.50E−03 | −2.53E−02 |
| $A_8$ | 4.93E−02 | −4.43E−03 | −4.98E−01 | −1.96E−01 | 3.89E−02 | −6.67E−02 |
| $A_{10}$ | −3.50E−02 | −1.71E−01 | 3.65E−02 | −1.19E−01 | −7.43E−02 | 1.79E−01 |
| $A_{12}$ | 0.00E+00 | 0.00E+00 | 2.44E−01 | 4.25E−02 | −2.92E−02 | −1.73E−01 |
| $A_{14}$ | 0.00E+00 | 0.00E+00 | −5.34E−01 | 3.26E−02 | 7.83E−02 | 5.27E−02 |

| Surface | 54a | 54b | 55a | 55b |
|---|---|---|---|---|
| K | 8.60E+01 | −1.05E−01 | −5.77E+00 | −9.74E−01 |
| $A_4$ | −4.15E−02 | 1.02E−01 | −3.05E−01 | −1.73E−01 |
| $A_6$ | −1.44E−01 | −2.16E−01 | 1.54E−02 | 6.13E−02 |
| $A_8$ | 6.95E−02 | 8.56E−02 | 2.92E−02 | −8.31E−03 |
| $A_{10}$ | −8.81E−02 | −1.03E−02 | 2.75E−03 | −8.59E−04 |
| $A_{12}$ | 1.50E−02 | −2.43E−02 | −2.61E−03 | 2.41E−04 |
| $A_{14}$ | 7.21E−03 | 1.26E−02 | 9.16E−04 | −1.70E−07 |

Table 14 lists the corresponding values for the abovementioned conditions of the optical imaging lens 50 according to the fifth embodiment. As shown in Table 14, the optical imaging lens 50 satisfies the abovementioned conditions.

TABLE 14

Fifth Embodiment

| No. | Condition | Value |
|---|---|---|
| 1 | f123/EFL | 0.89 |
| 2 | f2/f3 | −1.11 |
| 3 | R1/R2 | −0.29 |
| 4 | R3/R4 | −7.32 |
| 5 | R4/R6 | −0.99 |
| 6 | R2/R3 | 0.68 |
| 7 | R4/R5 | 0.63 |
| 8 | CT1/AT12 | 8.13 |
| 9 | CT2/AT23 | 1.26 |
| 10 | (CT1 + AT12 + CT2 + AT23 + CT3)/(CT4 + AT45 + CT5) | 1.29 |
| 11 | (Vd1 + Vd2 + Vd3)/(CT1 + AT12 + CT2 + AT23 + CT3) | 68.40 |
| 12 | (CT1 + AT12 + CT2 + AT23 + CT3)/TA | 0.486 |
| 13 | (Vd1 + Vd2 + Vd3)/(Vd4 + Vd5) | 2.44 |
| 14 | Vd1 | 37.22 |
| 15 | (Vd1 + Vd2 + Vd3) | 114.70 |

Referring to FIG. 5B, in order from left to right, which shows astigmatic field curves, a distortion curve and longitudinal spherical aberration curves of the optical imaging lens 50 according to the fifth embodiment. From the longitudinal spherical aberration curves, it shows that the off-axis rays in different heights at the respective wavelengths 470 nm, 555 nm, and 650 nm are focused in a vicinity of the imaging point. Based on extents of deviation of the curves for the respective wavelengths, imaging point deviations of the off-axis rays in different heights are controlled within a range of +0.01 mm. From the astigmatism field aberration curves at the reference wavelength 555 nm, the aberration of the sagittal curves in the whole field range falls within +0.01 mm; the aberration of the tangential curves in the whole field range falls within +0.03 mm. From the distortion aberration curves, the distortion aberration can be controlled within a range of 17.10%. Hence, the optical imaging lens 50 of the fifth embodiment is effectively to reduce aberration and can provide good imaging quality.

Sixth Embodiment

Figure 6A:
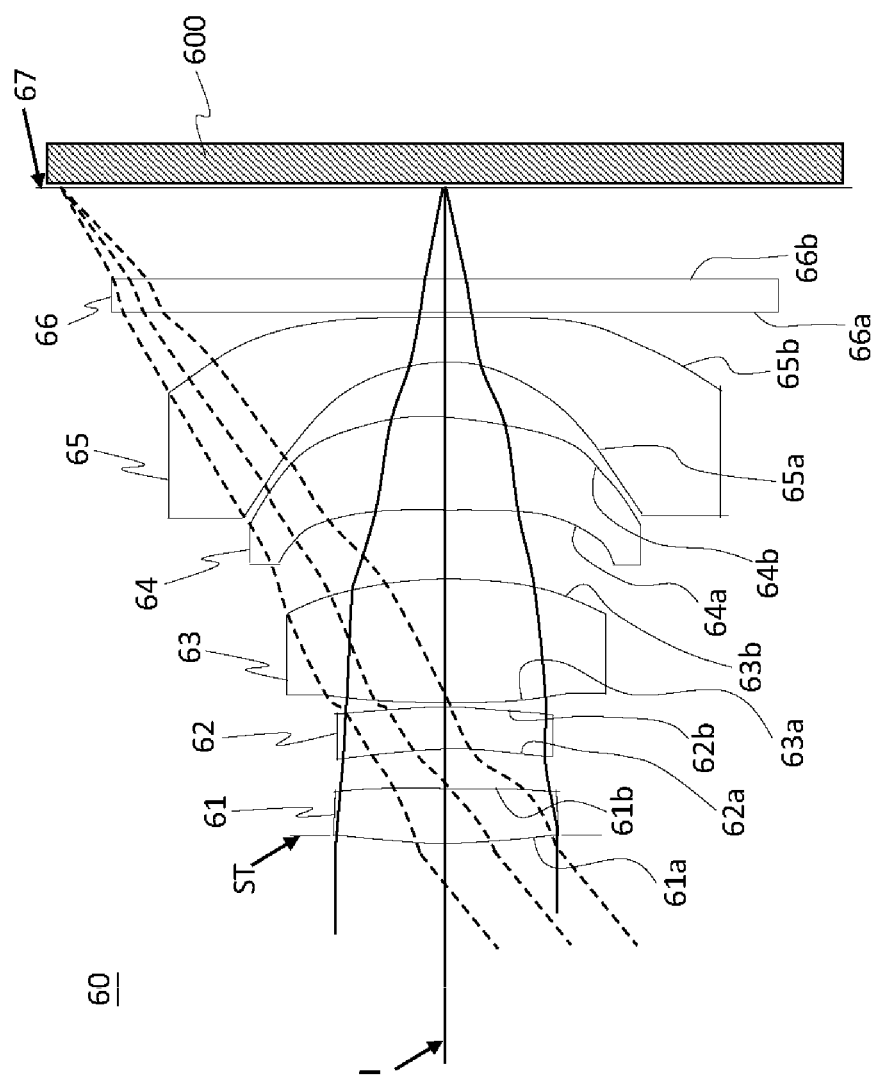
FIG. 6A is a schematic view of an optical imaging lens according to a sixth embodiment of the present disclosure.
Figure 6B:
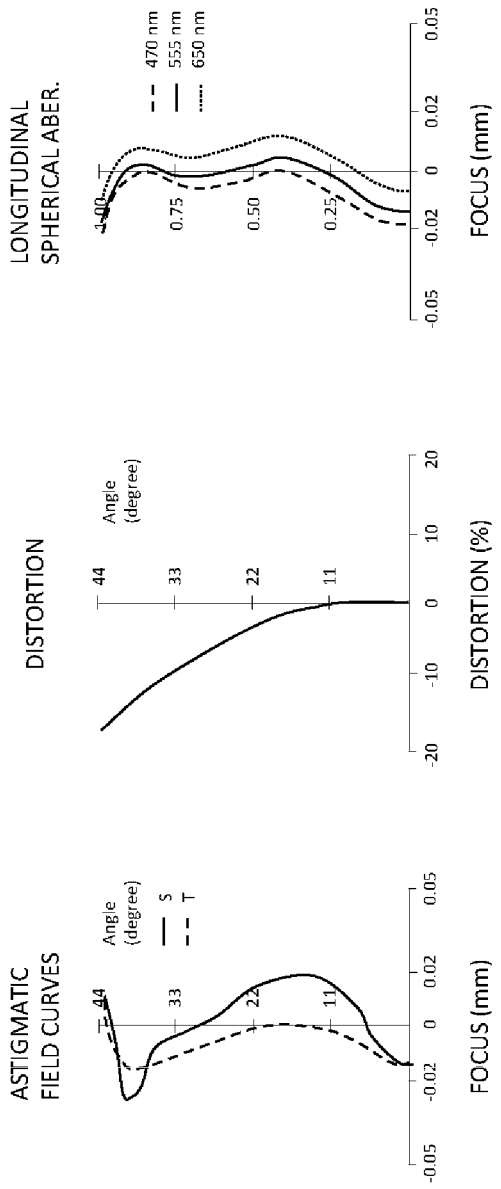
FIG. 6B shows longitudinal spherical aberration curves, astigmatic field curves and a distortion curve of the optical imaging lens according to the sixth embodiment.

FIG. 6A is a schematic view of an optical imaging lens according to the sixth embodiment of the present disclosure. FIG. 6B shows, in order from left to right, astigmatic field curves, a distortion curve and longitudinal spherical aberration curves of the optical imaging lens according to the sixth embodiment.

As shown in FIG. 6A, the optical imaging lens 60 of the sixth embodiment includes, in order from an object-side to an image side, an aperture ST, a first lens 61, a second lens 62, a third lens 63, a fourth lens 64 and a fifth lens 65. The optical imaging lens 60 can further include a filter element 66 and an image plane 67. An image sensor 600 can be disposed on the image plane 67 to form an imaging device (not labeled).

The first lens 61 has positive refractive power and includes an object-side surface 61a being convex and an image-side surface 61b being concave, wherein both of the object-side surface 61a and the image-side surface 61b of the first lens 61 are formed as aspheric surfaces. The first lens 61 is made of plastic material.

The second lens 62 has negative refractive power and includes an object-side surface 62a being concave and an image-side surface 62b being convex, wherein both of the object-side surface 62a and the image-side surface 62b of the second lens 62 are formed as aspheric surfaces. More detail, the object-side surface 62a of the second lens 62 is concave in a paraxial region thereof, while an off-axis region of the object-side surface 62a is convex. The second lens 62 is made of plastic material.

The third lens 63 has positive refractive power and includes an object-side surface 63a being convex and an image-side surface 63b being convex, wherein both of the object-side surface 63a and the image-side surface 63b of the third lens 63 are formed as aspheric surfaces. More detail, the object-side surface 63a of the third lens 63 is convex in a paraxial region thereof, while an off-axis region of the object-side surface 63a is concave; the image-side surface 63b of the third lens 63 is convex in both of a paraxial region and an off-axis region thereof. The third lens 63 is made of glass material.

The fourth lens 64 has positive refractive power and includes an object-side surface 64a being concave and an image-side surface 64b being convex, wherein both of the object-side surface 64a and the image-side surface 64b of the fourth lens 64 are formed as aspheric surfaces. More detail, the object-side surface 64a of the fourth lens 64 is concave in a paraxial region thereof, while an off-axis region of the object-side surface 64a is convex. The fourth lens 64 is made of plastic material.

The fifth lens 65 has negative refractive power and includes an object-side surface 65a being concave and an image-side surface 65b being concave, wherein both of the object-side surface 65a and the image-side surface 65b of the fifth lens 65 are formed as aspheric surfaces. More detail, the object-side surface 65a of the fifth lens 65 is concave in a paraxial region thereof, while an off-axis region of the object-side surface 65a is convex; the image-side surface 65b of the fifth lens 65 is concave in a paraxial region thereof, while an off-axis region of the image-side surface 65b is convex, wherein each of the object-side surface 65a and the image-side surface 65b includes inflection points which are symmetrical to the optical axis. The fifth lens 65 is made of plastic material.

The filter element 66 is disposed between the fifth lens 65 and the image plane 67, and adapted to filter out light of predetermined wavelengths. For example, the filter element 66 can be an IR-cut filter for filtering out infrared light. Both surfaces 66a, 66b of the filter element 66 are flat surfaces. The filter element 66 is made of glass material.

The image sensor 600 can be a CCD (Charge-Coupled Device) image sensor or a CMOS (Complementary Metal-Oxide-Semiconductor) image sensor, for example.

Referring to Table 15 and Table 16, wherein Table 15 shows the optical parameters of the optical imaging lens 60 according to the sixth embodiment of the present disclosure; Table 16 lists the values of the aspheric coefficients for each of the aspheric surfaces indicated in Table 15.

TABLE 15

Sixth embodiment
EFL = 3.24 mm, Fno = 2.22, HFOV = 43.99 deg

| | Surface | Surface Type | Curvature Radius (mm) | Distance (mm) | Refractive Index | Abbe Number | Focal Length (mm) | Material |
|---|---|---|---|---|---|---|---|---|
| Object | | | Infinite | 1000 | | | | |
| Aperture | ST | | Infinite | −0.098 | | | | |
| 1st Lens | 61a | ASP | 1.941 | 0.382 | 1.537 | 56.0 | 4.37 | Plastic |
| | 61b | ASP | 10.320 | 0.254 | | | | |
| 2nd Lens | 62a | ASP | −2.436 | 0.289 | 1.661 | 20.4 | −5.03 | Plastic |
| | 62b | ASP | −9.296 | 0.029 | | | | |
| 3rd Lens | 63a | ASP | 3.795 | 0.819 | 1.821 | 42.7 | 2.95 | Glass |
| | 63b | ASP | −6.138 | 0.492 | | | | |
| 4th Lens | 64a | ASP | −15.379 | 0.610 | 1.640 | 23.5 | 3.16 | Plastic |
| | 64b | ASP | −1.829 | 0.372 | | | | |
| 5th Lens | 65a | ASP | −1.162 | 0.279 | 1.661 | 20.4 | −1.62 | Plastic |
| | 65b | ASP | 16.691 | 0.058 | | | | |
| Filter element | 66a | Plano | Infinite | 0.210 | 1.517 | 64.2 | | Glass |
| | 66b | Plano | Infinite | 0.610 | | | | |
| Image Plane | 67 | Plano | Infinite | | | | | |

Reference Wavelength: 555 nm

TABLE 16

Sixth embodiment_ Aspheric Coefficients

| Surface | 61a | 61b | 62a | 62b | 63a | 63b |
|---|---|---|---|---|---|---|
| K | −8.37E+00 | 3.85E+01 | 4.32E+00 | 6.59E+00 | −5.68E+01 | 2.28E+01 |
| $A_4$ | 6.96E−02 | −1.20E−01 | 1.92E−01 | 7.45E−02 | −1.27E−02 | −6.57E−02 |
| $A_6$ | −1.59E−01 | −1.32E−01 | −1.19E−01 | 1.31E−01 | 1.19E−02 | −3.75E−02 |
| $A_8$ | −2.92E−02 | 4.51E−02 | 1.78E−01 | −9.84E−02 | −6.34E−02 | 4.56E−02 |
| $A_{10}$ | −1.59E−02 | 6.17E−03 | −1.21E−02 | 5.36E−02 | 1.80E−02 | −4.78E−02 |
| $A_{12}$ | 0.00E+00 | 0.00E+00 | 0.00E+00 | 0.00E+00 | 5.71E−02 | 1.73E−02 |
| $A_{14}$ | 0.00E+00 | 0.00E+00 | 0.00E+00 | 0.00E+00 | −3.42E−02 | 5.06E−04 |

| Surface | 64a | 64b | 65a | 65b |
|---|---|---|---|---|
| K | 5.56E+01 | −9.30E+00 | −3.11E+00 | −8.71E+01 |
| $A_4$ | −5.35E−02 | −7.76E−02 | −1.47E−01 | −9.77E−02 |
| $A_6$ | −6.84E−02 | −2.79E−03 | −6.42E−02 | 1.89E−02 |
| $A_8$ | −2.72E−03 | −3.35E−02 | 4.24E−02 | 6.58E−04 |
| $A_{10}$ | −1.38E−02 | 4.08E−04 | −1.57E−02 | −8.40E−04 |
| $A_{12}$ | −9.28E−03 | 5.27E−03 | 7.83E−03 | 4.79E−05 |
| $A_{14}$ | 6.65E−03 | −7.32E−05 | −6.80E−04 | 1.35E−05 |

Table 17 lists the corresponding values for the abovementioned conditions of the optical imaging lens 60 according to the sixth embodiment. As shown in Table 20, the optical imaging lens 60 satisfies the abovementioned conditions.

TABLE 17

Sixth Embodiment

| No. | Condition | Value |
|---|---|---|
| 1 | f123/EFL | 0.89 |
| 2 | f2/f3 | −1.70 |
| 3 | R1/R2 | 0.19 |
| 4 | R3/R4 | 0.26 |
| 5 | R4/R6 | 1.52 |
| 6 | R2/R3 | −4.24 |
| 7 | R4/R5 | −2.45 |
| 8 | CT1/AT12 | 1.50 |
| 9 | CT2/AT23 | 9.90 |
| 10 | (CT1 + AT12 + CT2 + AT23 + CT3)/(CT4 + AT45 + CT5) | 1.41 |

TABLE 17-continued

Sixth Embodiment

| No. | Condition | Value |
|---|---|---|
| 11 | (Vd1 + Vd2 + Vd3)/(CT1 + AT12 + CT2 + AT23 + CT3) | 68.75 |
| 12 | (CT1 + AT12 + CT2 + AT23 + CT3)/TA | 0.503 |
| 13 | (Vd1 + Vd2 + Vd3)/(Vd4 + Vd5) | 2.71 |
| 14 | Vd1 | 55.98 |
| 15 | (Vd1 + Vd2 + Vd3) | 121.90 |

Referring to FIG. 6B, in order from left to right, which shows astigmatic field curves, a distortion curve and longitudinal spherical aberration curves of the optical imaging lens 60 according to the sixth embodiment. From the longitudinal spherical aberration curves, it shows that the off-axis rays in different heights at the respective wavelengths 470 nm, 555 nm, and 650 nm are focused in a vicinity of the imaging point. Based on extents of deviation of the curves for the respective wavelengths, imaging point deviations of the off-axis rays in different heights are controlled within a range of +0.03 mm. From the astigmatism field aberration curves at the reference wavelength 555 nm, the aberration of the sagittal curves in the whole field range falls within +0.02 mm; the aberration of the tangential curves in the whole field range falls within +0.03 mm. From the distortion aberration curves, the distortion aberration can be controlled within a range of 15.78%. Hence, the optical imaging lens 60 of the sixth embodiment is effectively to reduce aberration and can provide good imaging quality.

Seventh Embodiment

According to a seventh embodiment of the present disclosure, an imaging device includes an optical imaging lens of the first to the sixth embodiments and an image sensor, wherein the image sensor is disposed on an image plane of the optical imaging lens. The image sensor could be a CCD (Charge-Coupled Device) image sensor or a CMOS (Complementary Metal-Oxide-Semiconductor) image sensor, etc.

Eighth Embodiment

Figure 7:
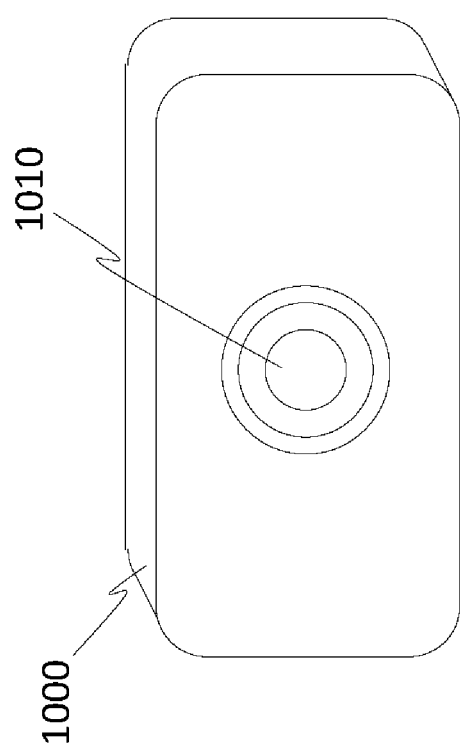
FIG. 7 is a schematic view of an electronic device according to the eighth embodiment of the present disclosure.

FIG. 7 is a schematic view of an electronic device according to an eighth embodiment of the present disclosure. As shown in FIG. 8, the electronic device 1000 includes an imaging device 1010 of the seventh embodiment of the present disclosure.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An optical imaging lens comprising, in order from an object-side to an image side:
   an aperture;
   a first lens with positive refractive power, having an object-side surface being convex;
   a second lens with negative refractive power, having an object-side surface being concave;
   a third lens with positive refractive power, having an image-side surface being convex;
   a fourth lens with positive refractive power, having an image-side surface being convex; and
   a fifth lens with negative refractive power, having an object-side surface being concave, wherein, the optical imaging lens includes a total number of five lens elements, and following conditions are satisfied:

$0.75 \le f123/EFL \le 0.95$; and $-2.10 \le f2/f3 \le -1.15$, where, f123 is a combined focal length of a group of the first lens, the second lens and the third lens, EFL is an effective focal length of the optical imaging lens, f2 is a focal length of the second lens, and f3 is a focal length of the third lens.

2. The optical imaging lens of claim 1, wherein a curvature radius of the object-side surface of the first lens is R1, a curvature radius of the image-side surface of the first lens is R2, and a following condition is satisfied:

$-0.45 \le R1/R2 \le 0.55$.

3. The optical imaging lens of claim 1, wherein a curvature radius of the image-side surface of the first lens is R2, a curvature radius of the object-side surface of the second lens is R3, and a following condition is satisfied:

$-4.30 \le R2/R3 \le 1.50$.

4. The optical imaging lens of claim 1, wherein a curvature radius of the object-side surface of the second lens is R3, a curvature radius of the image-side surface of the second lens is R4, and a following condition is satisfied:

$-12.55 \le R3/R4 \le 0.20$.

5. The optical imaging lens of claim 1, wherein a curvature radius of the image-side surface of the second lens is R4; a curvature radius of the object-side surface of the third lens is R5, and a following condition is satisfied:

$-2.50 \le R4/R5 \le 3.30$.

6. The optical imaging lens of claim 1, wherein a curvature radius of the image-side surface of the second lens is R4, a curvature radius of the image-side surface of the third lens is R6, and a following condition is satisfied:

$-4.50 \le R4/R6 \le -2.00$.

7. The optical imaging lens of claim 1, wherein a thickness of the first lens on the optical axis of the optical imaging lens is CT1, a distance from the image-side surface of the first lens to the object-side surface of the second lens along the optical axis of the optical imaging lens is AT12, and a following condition is satisfied:

$1.35 \le CT1/AT12 \le 9.15$.

8. The optical imaging lens of claim 1, wherein a thickness of the second lens on the optical axis of the optical imaging lens is CT2; a distance from the image-side surface of the second lens to the object-side surface of the third lens along the optical axis of the optical imaging lens is AT23, and a following condition is satisfied:

$1.05 \le CT2/AT23 \le 10.05$.

9. The optical imaging lens of claim 1, wherein an abbe number of the first lens is Vd1, and a following condition is satisfied:

$Vd1 \ge 30$.

10. The optical imaging lens of claim 1, wherein an abbe number of the first lens is Vd1, an abbe number of the second lens is Vd2, an abbe number of the third lens is Vd3, and a following condition is satisfied:

$105.0 \le (Vd1+Vd2+Vd3) \le 125.0$.

11. The optical imaging lens of claim 1, wherein an abbe number of the first lens is Vd1, an abbe number of the second lens is Vd2, an abbe number of the third lens is Vd3, an abbe number of the fourth lens is Vd4, an abbe number of the fifth lens is Vd5, and a following condition is satisfied:

$2.20 \le (Vd1+Vd2+Vd3)/(Vd4+Vd5) \le 2.85$.

12. The optical imaging lens of claim 7, wherein a thickness of the first lens on the optical axis of the optical imaging lens is CT1, a thickness of the second lens on the optical axis of the optical imaging lens is CT2, a thickness of the third lens on the optical axis of the optical imaging lens is CT3, a thickness of the fourth lens on the optical axis of the optical imaging lens is CT4, a thickness of the fifth lens on the optical axis of the optical imaging lens is CT5, a distance from the image-side surface of the first lens to the object-side surface of the second lens along the optical axis of the optical imaging lens is AT12, a distance from the image-side surface of the second lens to the object-side surface of the third lens along the optical axis of the optical imaging lens is AT23, a distance from the image-side surface of the fourth lens to the object-side surface of the fifth lens along the optical axis of the optical imaging lens is AT45, and a following condition is satisfied:

$$1.00 \leq (CT1+AT12+CT2+AT23+CT3)/(CT4+AT45+CT5) \leq 1.55.$$

13. The optical imaging lens of claim 7, wherein an abbe number of the first lens is Vd1, an abbe number of the second lens is Vd2, an abbe number of the third lens is Vd3, a thickness of the first lens on the optical axis of the optical imaging lens is CT1, a thickness of the second lens on the optical axis of the optical imaging lens is CT2, a thickness of the third lens on the optical axis of the optical imaging lens is CT3, a distance from the image-side surface of the first lens to the object-side surface of the second lens along the optical axis of the optical imaging lens is AT12, a distance from the image-side surface of the second lens to the object-side surface of the third lens along the optical axis of the optical imaging lens is AT23, and a following condition is satisfied:

$$60.00 \leq (Vd1+Vd2+Vd3)/(CT1+AT12+CT2+AT23+CT3) \leq 75.50.$$

14. The optical imaging lens of claim 7, wherein a thickness of the first lens on the optical axis of the optical imaging lens is CT1, a thickness of the second lens on the optical axis of the optical imaging lens is CT2, a thickness of the third lens on the optical axis of the optical imaging lens is CT3, a distance from the image-side surface of the first lens to the object-side surface of the second lens along the optical axis of the optical imaging lens is AT12, a distance from the image-side surface of the second lens to the object-side surface of the third lens along the optical axis of the optical imaging lens is AT23, a distance from the object-side surface of the first lens to the image-side surface of the fifth lens along the optical axis of the optical imaging lens is TA, and a following condition is satisfied:

$$0.450 \leq (CT1+AT12+CT2+AT23+CT3)/TA \leq 0.510.$$

15. An imaging device, comprising the optical imaging lens of claim 1 and an image sensor, wherein the image sensor is disposed on an image plane of the optical imaging lens.

16. An electronic device, comprising the imaging device of claim 15.

* * * * *